United States Patent
Bar-Or Tillinger et al.

(10) Patent No.: US 12,513,687 B2
(45) Date of Patent: Dec. 30, 2025

(54) DOWNLINK CONTROL INFORMATION FORMAT FOR PHYSICAL DOWNLINK SHARED CHANNEL SCHEDULING FOR MULTI INCREMENTAL REDUNDANCY SCHEME

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Assaf Touboul, Netanya (IL); Tal Oved, Modiin (IL)

(73) Assignee: Qualcomm Incorporated, San Diego, CA (US)

( * ) Notice: Subject to any disclaimer, the term of this patent is extended or adjusted under 35 U.S.C. 154(b) by 521 days.

(21) Appl. No.: 17/832,491

(22) Filed: Jun. 3, 2022

(65) Prior Publication Data

US 2023/0397188 A1  Dec. 7, 2023

(51) Int. Cl.
| | | |
|---|---|---|
| *H04W 72/1263* | (2023.01) | |
| *H04L 1/08* | (2006.01) | |
| *H04L 5/00* | (2006.01) | |
| *H04W 72/0446* | (2023.01) | |
| *H04W 72/21* | (2023.01) | |
| *H04W 72/566* | (2023.01) | |

(52) U.S. Cl.
CPC ........ *H04W 72/1263* (2013.01); *H04L 1/08* (2013.01); *H04L 5/0053* (2013.01); *H04W 72/0446* (2013.01); *H04W 72/21* (2023.01); *H04W 72/569* (2023.01)

(58) Field of Classification Search
CPC ......... H04W 72/1263; H04W 72/0446; H04W 72/21; H04W 72/569; H04L 1/08; H04L 5/0053; H04L 1/1854; H04L 1/1819; H04L 1/1864; H04L 1/1896
See application file for complete search history.

(56) References Cited

U.S. PATENT DOCUMENTS

| | | | | |
|---|---|---|---|---|
| 2006/0002484 A1* | 1/2006 | Miyazaki | .............. | H04L 1/1845 375/259 |
| 2019/0334664 A1* | 10/2019 | Guan | ..................... | H04L 1/1887 |
| 2020/0059327 A1* | 2/2020 | Kini | ...................... | H04L 5/0055 |
| 2020/0196335 A1* | 6/2020 | Lei | ......................... | H04L 1/1614 |
| 2020/0374043 A1* | 11/2020 | Lei | ......................... | H04L 1/1845 |
| 2021/0266105 A1* | 8/2021 | Lei | ......................... | H04L 1/1607 |
| 2022/0182879 A1* | 6/2022 | Fehrenbach | .......... | H04W 28/06 |
| 2023/0269609 A1* | 8/2023 | Wang | .................... | H04W 72/54 370/328 |

\* cited by examiner

*Primary Examiner* — Asad M Nawaz
*Assistant Examiner* — Najeeb Ansari
(74) *Attorney, Agent, or Firm* — Holland & Hart LLP

(57) ABSTRACT

Methods, systems, and devices for wireless communications are described. An example method includes receiving a first transmission of one or more code blocks in a first slot and transmitting uplink control information that includes acknowledgement information for the one or more code blocks. The method also includes receiving a scheduling signal that indicates one or more parameters associated with a re-transmission scheduling policy based at least in part on the acknowledgement information. The method also includes receiving a second transmission of at least a portion of the one or more code blocks in a second slot and decoding the second transmission of at least the portion of the one or more code blocks according to the re-transmission scheduling policy.

30 Claims, 16 Drawing Sheets

DOWNLINK CONTROL INFORMATION FORMAT FOR PHYSICAL DOWNLINK SHARED CHANNEL SCHEDULING FOR MULTI INCREMENTAL REDUNDANCY SCHEME

FIELD OF TECHNOLOGY

The following relates to wireless communications, including downlink control information (DCI) format for physical downlink shared channel (PDSCH) scheduling for (MIRS).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support new DCI format for PDSCH scheduling for MIRS. For example, the described techniques provide for a DCI format that reduces the amount of resources used for control information for re-transmissions of code blocks.

A method for wireless communication is described. The method may include receiving, from a network entity, a first transmission of one or more code blocks in a first slot, transmitting, to the network entity, uplink control information that includes acknowledgement information for the one or more code blocks, where the acknowledgement information indicates an acknowledged or negative acknowledged status of the one or more code blocks, receiving, from a network entity, a scheduling signal that indicates one or more parameters associated with a re-transmission scheduling policy based on the acknowledgement information, receiving a second transmission of at least a portion of the one or more code blocks in a second slot, and decoding the second transmission of at least the portion of the one or more code blocks according to the re-transmission scheduling policy.

An apparatus for wireless communication is described. The apparatus may include a processor, memory coupled with the processor, and instructions stored in the memory. The instructions may be executable by the processor to cause the apparatus to receive, from a network entity, a first transmission of one or more code blocks in a first slot, transmit, to the network entity, uplink control information that includes acknowledgement information for the one or more code blocks, where the acknowledgement information indicates an acknowledged or negative acknowledged status of the one or more code blocks, receive, from a network entity, a scheduling signal that indicates one or more parameters associated with a re-transmission scheduling policy based on the acknowledgement information, receive a second transmission of at least a portion of the one or more code blocks in a second slot, and decode the second transmission of at least the portion of the one or more code blocks according to the re-transmission scheduling policy.

Another apparatus for wireless communication is described. The apparatus may include means for receiving, from a network entity, a first transmission of one or more code blocks in a first slot, means for transmitting, to the network entity, uplink control information that includes acknowledgement information for the one or more code blocks, where the acknowledgement information indicates an acknowledged or negative acknowledged status of the one or more code blocks, means for receiving, from a network entity, a scheduling signal that indicates one or more parameters associated with a re-transmission scheduling policy based on the acknowledgement information, means for receiving a second transmission of at least a portion of the one or more code blocks in a second slot, and means for decoding the second transmission of at least the portion of the one or more code blocks according to the re-transmission scheduling policy.

A non-transitory computer-readable medium storing code for wireless communication is described. The code may include instructions executable by a processor to receive, from a network entity, a first transmission of one or more code blocks in a first slot, transmit, to the network entity, uplink control information that includes acknowledgement information for the one or more code blocks, where the acknowledgement information indicates an acknowledged or negative acknowledged status of the one or more code blocks, receive, from a network entity, a scheduling signal that indicates one or more parameters associated with a re-transmission scheduling policy based on the acknowledgement information, receive a second transmission of at least a portion of the one or more code blocks in a second slot, and decode the second transmission of at least the portion of the one or more code blocks according to the re-transmission scheduling policy.

Some examples of the method, apparatuses, and non-transitory computer-readable medium described herein may further include operations, features, means, or instructions for receiving a confirmation signal that indicates received acknowledgement information on which the re-transmission scheduling policy may be based.

Some examples of the method, apparatuses, and non-transitory computer-readable medium described herein may further include operations, features, means, or instructions for comparing the acknowledgement information for the one or more code blocks to the received acknowledgement information from the confirmation signal and transmitting a correction signal that indicates that the received acknowledgement information may be incorrect based on the received acknowledgement information not matching the acknowledged or negative acknowledged status of the one or more code blocks.

Some examples of the method, apparatuses, and non-transitory computer-readable medium described herein may further include operations, features, means, or instructions for receiving an updated scheduling signal that indicates one or more updated parameters based on the correction signal and receiving a third transmission of at least the portion of the one or more code blocks, where decoding the third transmission may be further based on the one or more updated parameters.

In some examples of the method, apparatuses, and non-transitory computer-readable medium described herein, the confirmation signal indicates an acknowledgement or negative acknowledgement status per code block or a decoding status of the uplink control information.

In some examples of the method, apparatuses, and non-transitory computer-readable medium described herein, the re-transmission scheduling policy further includes an indication of a rank or a precoder resource group size and the rank or the precoder resource group size may be associated with the first slot or the second slot.

In some examples of the method, apparatuses, and non-transitory computer-readable medium described herein, the one or more parameters associated with the re-transmission scheduling policy includes a code block ordering in time and frequency, a redundancy version increase policy, a number of resources allocated per re-transmission, or a maximum number of re-transmissions for a code block.

Some examples of the method, apparatuses, and non-transitory computer-readable medium described herein may further include operations, features, means, or instructions for receiving a dedicated downlink control information message that indicates a list of code blocks excluded from the re-transmission scheduling policy.

Some examples of the method, apparatuses, and non-transitory computer-readable medium described herein may further include operations, features, means, or instructions for receiving downlink control information having a format of a first type and overriding the re-transmission scheduling policy based on the downlink control information.

In some examples of the method, apparatuses, and non-transitory computer-readable medium described herein, the re-transmission scheduling policy indicates a latency priority for the one or more code blocks.

In some examples of the method, apparatuses, and non-transitory computer-readable medium described herein, receiving the scheduling signal may include operations, features, means, or instructions for receiving the scheduling signal in a radio resource control message or a media access control (MAC) control element.

A method for wireless communication is described. The method may include transmitting, to a user equipment (UE), a first transmission of one or more code blocks in a first slot, receiving, from the UE, uplink control information that includes acknowledgement information for the one or more code blocks, where the acknowledgement information indicates an acknowledged or negative acknowledged status of the one or more code blocks, transmitting, to the UE, a scheduling signal that indicates one or more parameters associated with a re-transmission scheduling policy based on the acknowledgement information, and transmitting a second transmission of at least a portion of the one or more code blocks in a second slot.

An apparatus for wireless communication is described. The apparatus may include a processor, memory coupled with the processor, and instructions stored in the memory. The instructions may be executable by the processor to cause the apparatus to transmit, to a UE, a first transmission of one or more code blocks in a first slot, receive, from the UE, uplink control information that includes acknowledgement information for the one or more code blocks, where the acknowledgement information indicates an acknowledged or negative acknowledged status of the one or more code blocks, transmit, to the UE, a scheduling signal that indicates one or more parameters associated with a re-transmission scheduling policy based on the acknowledgement information, and transmit a second transmission of at least a portion of the one or more code blocks in a second slot.

Another apparatus for wireless communication is described. The apparatus may include means for transmitting, to a UE, a first transmission of one or more code blocks in a first slot, means for receiving, from the UE, uplink control information that includes acknowledgement information for the one or more code blocks, where the acknowledgement information indicates an acknowledged or negative acknowledged status of the one or more code blocks, means for transmitting, to the UE, a scheduling signal that indicates one or more parameters associated with a re-transmission scheduling policy based on the acknowledgement information, and means for transmitting a second transmission of at least a portion of the one or more code blocks in a second slot.

A non-transitory computer-readable medium storing code for wireless communication is described. The code may include instructions executable by a processor to transmit, to a UE, a first transmission of one or more code blocks in a first slot, receive, from the UE, uplink control information that includes acknowledgement information for the one or more code blocks, where the acknowledgement information indicates an acknowledged or negative acknowledged status of the one or more code blocks, transmit, to the UE, a scheduling signal that indicates one or more parameters associated with a re-transmission scheduling policy based on the acknowledgement information, and transmit a second transmission of at least a portion of the one or more code blocks in a second slot.

Some examples of the method, apparatuses, and non-transitory computer-readable medium described herein may further include operations, features, means, or instructions for transmitting, to the UE, a confirmation signal that indicates the received acknowledgement information on which the re-transmission scheduling policy may be based.

Some examples of the method, apparatuses, and non-transitory computer-readable medium described herein may further include operations, features, means, or instructions for receiving, from the UE, a correction signal that indicates that the received acknowledgement information may be incorrect based on the received acknowledgement information not matching an actual acknowledged or negative acknowledged status of the one or more code blocks.

Some examples of the method, apparatuses, and non-transitory computer-readable medium described herein may further include operations, features, means, or instructions for transmitting, to the UE, an updated scheduling signal that indicates one or more updated parameters based on the correction signal and transmitting a third transmission of at least the portion of the one or more code blocks.

In some examples of the method, apparatuses, and non-transitory computer-readable medium described herein, the confirmation signal indicates an acknowledgement or negative acknowledgement status per code block or a decoding status of the uplink control information.

In some examples of the method, apparatuses, and non-transitory computer-readable medium described herein, the re-transmission scheduling policy further includes an indication of a rank or a precoder resource group size and the rank or the precoder resource group size may be associated with the first slot or the second slot.

In some examples of the method, apparatuses, and non-transitory computer-readable medium described herein, the one or more parameters associated with the re-transmission scheduling policy includes a code block ordering in time and frequency, a redundancy version increase policy, a number of resources allocated per re-transmission, or a maximum number of re-transmissions for a code block.

Some examples of the method, apparatuses, and non-transitory computer-readable medium described herein may further include operations, features, means, or instructions for transmitting, to the UE, a dedicated downlink control information message that indicates a list of code blocks excluded from the re-transmission scheduling policy.

Some examples of the method, apparatuses, and non-transitory computer-readable medium described herein may further include operations, features, means, or instructions for transmitting, to the UE, downlink control information having a format of a first type, where the re-transmission scheduling policy does not apply to a subset of the one or more code blocks based on the downlink control information.

In some examples of the method, apparatuses, and non-transitory computer-readable medium described herein, the re-transmission scheduling policy indicates a latency priority for the one or more code blocks.

In some examples of the method, apparatuses, and non-transitory computer-readable medium described herein, transmitting the scheduling signal may include operations, features, means, or instructions for transmitting, to the UE, the scheduling signal in a radio resource control message or a MAC control element.

DETAILED DESCRIPTION

Figure 1:
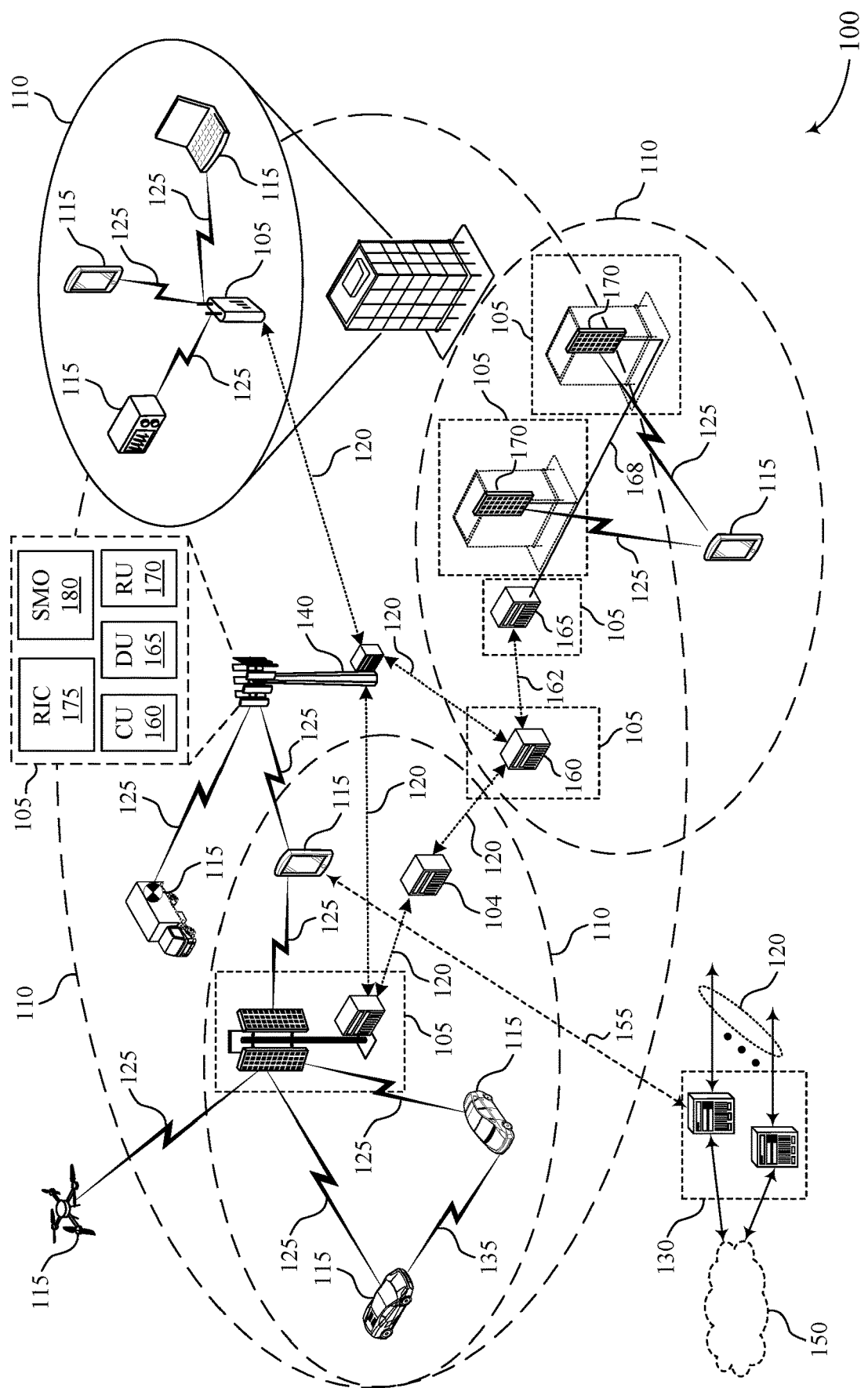
FIG. 1 illustrates an example of a wireless communications system that supports a DCI format for PDSCH scheduling for MIRS in accordance with one or more aspects of the present disclosure.

In some examples, communication devices may provide channel state information (CSI) to other devices that includes feedback related to a channel between the devices. The device may then encode a message using a level of redundancy (e.g., based on a coding scheme) that corresponds to an acceptable block error rate (BLER) for the message. An automatic repeat request (ARQ) scheme such as hybrid-ARQ (HARQ) may be used to transmit additional redundancy information when the first device fails to successfully decode one or more code blocks in the message. However, continuously using a level of redundancy that achieves a desired BLER may result in unnecessary redundant information included for some messages (e.g., where the message could have been decoded with less redundancy information).

DCI supports scheduling of PDSCH allocations between two or more devices. The DCI may be carried by a physical downlink control channel (PDCCH) and include information that a receiving device may use to decode a corresponding message. However, sending the DCI with conventional techniques may use a lot of PDCCH resources overhead. That is, the number of symbols at the beginning of each slot may be high, in order to include the information needed for decoding. When the channel is changing frequently, such as when a UE 115 is moving, during a storm, near many other transmitting devices, or subject to other conditions that may cause a channel to change, the amount of overhead required to send the DCI may be large. This effect may be more pronounced in the sub-THz (e.g., FR4, FR5) bands than in other bands, as the number of beams and UEs will increase dramatically.

In order to reduce the amount of unnecessary redundancy information transmitted, network devices may implement an incremental redundancy scheme such as multiple incremental redundancy scheme (MIRS). Incremental redundancy schemes, such as MIRS, may be used to re-transmit code blocks that were not correctly received or decoded. For example, a sending device may initially transmit a transmission in a first slot with no or with a reduced amount of redundancy. If the receiving device indicates to the sending device that it has failed to receive at least a portion of the transmission, such as one or more code blocks, the sending device may transmit, in a next slot, a re-transmission with redundant information corresponding to the failed one or more code blocks from the previous re-transmission. The sending device may continue to send additional redundant information in each following slot until the receiving device successfully decodes the message in the transmission. The re-transmissions may also include additional code blocks not included in the original transmission if there are available resources in the slot to transmit the additional code blocks.

Techniques such as MIRS may improve the rate of a device, but may still use too much overhead if the channel is varying in time. Conventional techniques for scheduling a MIRS slot is also very complex to signal as it carries multiple code blocks at multiple states (e.g., each code block may have a different number of resources, may be after a different number of transmissions, etc.). This complexity may result in a large resource overhead. The communication system may use CSI-based mechanisms to periodically determine channel parameters. For example, a network entity may periodically send reference signals in the downlink channel to the UE. The UE may measure the channel using the reference signals, which can be done every 10 milliseconds (ms), 20 ms, or the other timeframe. The periodicity may be a system parameter configured by the network entity. Based on these measurements, the UE can feedback CSI to the network entity. Information such as what the currently best suited coding rate for these channel conditions can be held by the devices. For example, if the UE determines it has a high signal-to-noise ratio (SNR), the UE can suggest using a higher modulation and a higher coding rate, can increase the data rate, and generally would not need a lot of protection for the code blocks. The UE could signal the rank of the channel and what precoding is best for the channel. The network entity can receive these signals and apply the suggested settings.

In situations where the channel changes rapidly (e.g., the UE is moving, such as 10 kilometers or more per hour), the devices may have to track rapid changes to the channel. Thus, the periodicity may have to be very fast, otherwise the previous measurement will no longer be relevant after a few slots due to the channel aging. Having high frequency channel measurements can be very resource consuming and a lot of bandwidth would have to be dedicated to communicating the corresponding CSI. When the channel cannot be sufficiently tracked, some capacity of the channel may be underutilized. This reduces the throughput that could have been achieved with a more suitable coding rate and MSC. MIRS and other redundancy schemes improve throughput but rely heavily on re-transmission.

However, when applying MIRS, the potential number of transmitted transport blocks during a single slot may be much higher than when MIRS is not used, which may result in a significant increase in the DCI payload. MIRS techniques may start with optimistic settings for the channel conditions (such as a high coding rate and MCS), and then reduce the conditions if code blocks fail. After a failure, the sending device may transmit a different subset of the forward error correction bits of the failed code blocks, but a smaller number of resources for the re-transmission for the failed coding blocks may be used. Because the effective coding rate is only increased by a small amount, the re-transmission may still fail. After performing several such re-transmissions with incremental changes, where each time only a small number of resources are dedicated for the re-transmission, the correct coding rate and MCS for the channel may be discovered. The system may use close to the exact number of resources necessary to pass the code block successfully.

While MIRS may use most of the channel capacity, it relies heavily on re-transmission, which can result in increased latency, inefficiency, and large control channel overhead for DCI. MIRS conventionally sends DCI for every slot, so that every time a device receives data in a slot, it also receives DCI that describes entirely how the slot is structured. That is, every time the PDSCH is scheduled, the PDCCH is also scheduled with it to describe how the slot is structured. Because of re-transmissions used with MIRS, the slot structure could be complicated, resulting in a large DCI payload. Because the number of resources that can be dedicated for control is limited, a new format for DCI signaling has been developed that can reduce the number of parameters that are sent in DCI when transmitting using MIRS.

Techniques described herein provide a new format for DCI signaling that may be used with MIRS. For example, techniques are described herein for a sending device to use feedback information, such as ACK/NACK information, associated with one or more transmitted code blocks from the receiving device to create a re-transmission scheduling policy for re-transmitting failed code blocks. The re-transmission scheduling policy may include one or more parameters in DCI for the receiving device to use to decode the re-transmission. The one or more parameters may include a code block ordering in time and frequency, a redundancy version increase policy, a number of resources allocated per re-transmission, a maximum number of re-transmissions for a code block, and the like. The re-transmission scheduling policy may be sent in DCI via an RRC or MAC-CE messages. Techniques are introduced as a double-check on the correct ACK/NACK status of the code blocks. Techniques are also introduced for when the sending device wants to use a legacy DCI process instead of a re-transmission scheduling policy as described herein.

Aspects of the disclosure are initially described in the context of wireless communications systems. Aspects of the disclosure are further illustrated by and described with reference to swim diagrams, conceptual diagrams, and flowcharts. Aspects of the disclosure are further illustrated by and described with reference to apparatus diagrams, system diagrams, and flowcharts that relate to a new DCI format for PDSCH scheduling for MIRS.

FIG. 1 illustrates an example of a wireless communications system 100 that supports a DCI format for PDSCH scheduling for MIRS in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support a new DCI format for PDSCH scheduling for MIRS as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support re-transmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support re-transmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and re-transmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

When schemes such as MIRS are used when channel conditions are changing, such as when a UE is moving, a lot of DCI resources may be used to provide updated channel information for re-transmission of the failed code blocks. This may lead to inefficient use of spectral resources and large consumption of power. Techniques described herein provide a new DCI format that reduces the DCI payload for re-transmissions.

A UE 115 may implement one or more techniques that support a DCI format for PDSCH scheduling for MIRS. The UE 115 may receive, from a network entity 105, a first transmission of one or more code blocks in a first slot. The UE 115 may transmit, to the network entity 105, uplink control information (UCI) that includes acknowledgement information for the one or more code blocks (ACK or NACK status of the one or more code blocks). The UE 115 may include receiving, from the network entity 105, a scheduling signal that indicates one or more parameters associated with a re-transmission scheduling policy based at least in part on the acknowledgement information. The UE 115 may receive, from the network entity 105, a second transmission of at least a portion of the one or more code blocks in a second slot. The UE 115 may also decode the second transmission of at least the portion of the one or more code blocks according to the re-transmission scheduling policy.

A network entity 105 may implement one or more techniques that support a DCI format for PDSCH scheduling for MIRS. The network entity 105 may transmit, to a UE 115, a first transmission of one or more code blocks in a first slot. The network entity 105 may receive, from the UE 115, UCI that includes acknowledgement information for the one or more code blocks, wherein the acknowledgement information indicates an acknowledged or negative acknowledged status of the one or more code blocks. The network entity 105 may transmit, to the UE 115, a scheduling signal that indicates one or more parameters associated with a re-transmission scheduling policy based at least in part on the acknowledgement information. The network entity 105 may transmit, to the UE 115, a second transmission of at least a portion of the one or more code blocks in a second slot.

The format for DCI signaling described herein, in which some parameters related to transport blocks in re-transmission are omitted from the DCI, results in a significant reduction in DCI payload. This also results in a reduction in the required PDCCH resources, especially for the MIRS scheme which relies heavily on re-transmissions.

Figure 2:
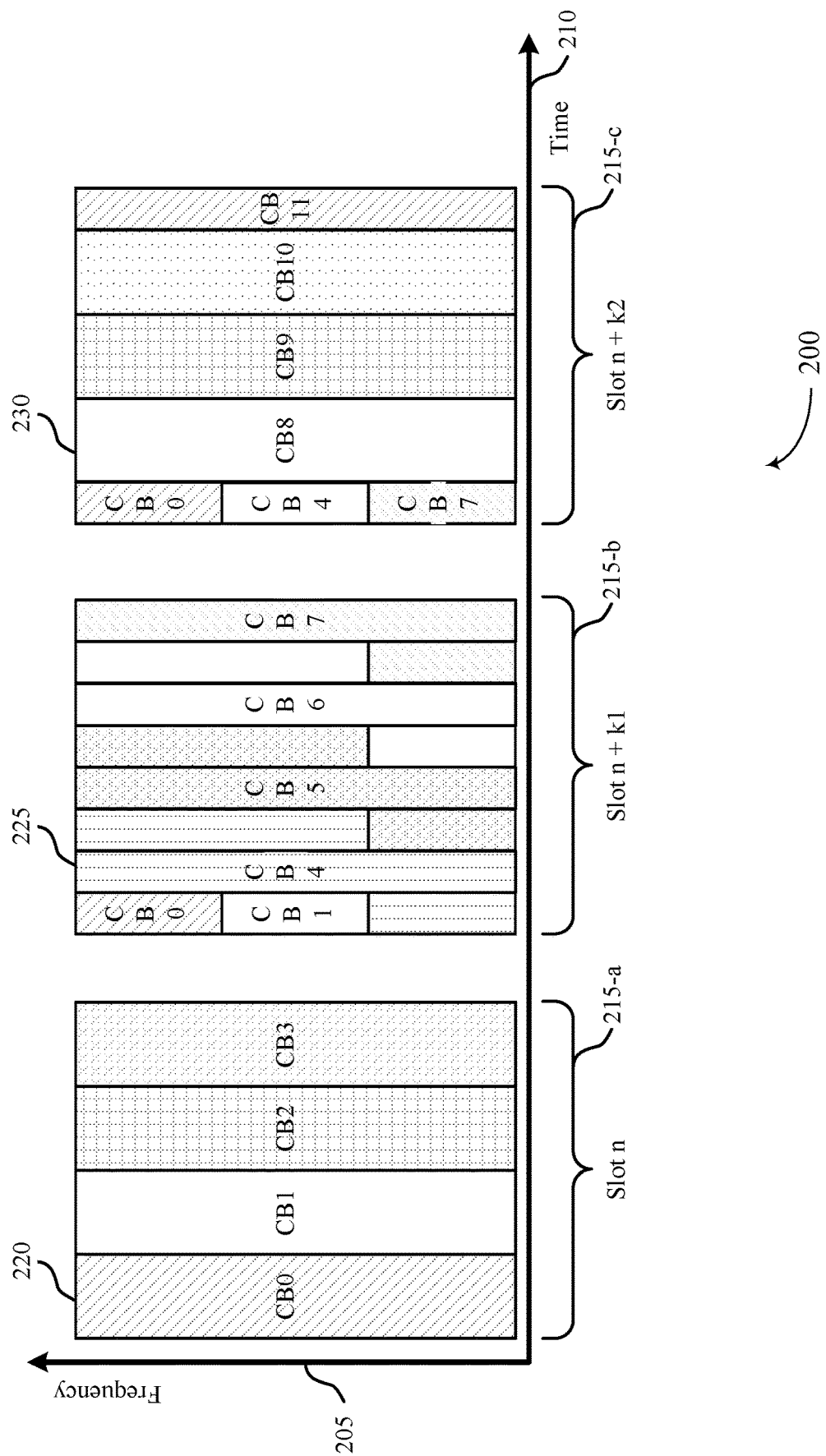
FIG. 2 illustrates an example of a graph that supports a DCI format for PDSCH scheduling for MIRS in accordance with one or more aspects of the present disclosure.

FIG. 2 illustrates an example of a graph 200 that supports a DCI format for PDSCH scheduling for MIRS in accordance with one or more aspects of the present disclosure. FIG. 2 shows a single HARQ process represented on the graph 200 of frequency 205 over time 210 for a PDSCH. Three slots are illustrated in the graph 200, including a slot n 215-a, a slot n+k1 215-b, and a slot n+k2 215-c (collectively referred to herein as slots 215). The slots 215 may be transmitted from one device to another device or many devices. For example, a network entity 105 may transmit the slots 215 to a UE 115. In other examples, the UE 115 may transmit the slots 215 to the network entity 105 or to another UE. the graph 200 may correspond to techniques described herein for MIRS. The slots 215 may be PDSCH or PDCCH transmissions, for example. The coefficient k may be reflective of a delay between a re-transmission of the same HARQ process due to the latency of transmitting, receiving, and processing the ACK/NACK from the UE to the network entity.

In some examples, multiple HARQ processes may be interleaved in time. For example, one HARQ process may send a first transmission in a first slot, a second HARQ process may send a first transmission in the next slot, a fourth HARQ process may send a first transmission in the slot after that, etc. Interleaving multiple HARQ processes may enable continuous transmissions to the same UE. However, in the example of FIG. 2, for simplicity of illustration, a single HARQ process is shown.

In order to reduce the amount of unnecessary redundancy information transmitted, network devices may implement an incremental redundancy scheme such as MIRS. MIRS may be used to re-transmit code blocks that were not correctly received or decoded. For example, the network entity may initially transmit a transmission in a first slot with no or a reduced amount of redundancy. If the UE indicates to the network entity that it has failed to receive at least a portion of the transmission, such as one or more code blocks, the network entity may transmit a re-transmission with redundant information corresponding to the failed one or more code blocks from the previous re-transmission in a next slot. The network entity may continue to send additional redundant information in each following slot until the UE successfully decodes the message in the transmission. The re-transmissions may also include additional code blocks not included in the original transmission if there are available resources in the slot.

In the example described in FIG. 2, a network entity, such as a network entity 105, may send transmissions with code blocks 220 to a UE, such as a UE 115. The graph 200 illustrates an example of how MIRS scheduling may be performed. The graph 200 includes three slots 215. In slot n 215-*a*, the network entity may transmit four code blocks 220. The four code blocks 220 may include a code block 0 (CB0), a code block 1 (CB1), a code block 2 (CB2), and a code block 3 (CB3). In this example, CB0 and CB1 failed. That is, the UE was unable to successfully decode CB0 and CB1.

Because CB0 and CB1 failed, the network entity may re-transmit them in the next slot, slot n+k1 215-*b*. The re-transmission may consume a small number of resources of slot n+k1 215-*b*, and all of the remaining resources in slot n+k1 215-*b* may be dedicated for new code blocks, CB4 through CB7. The network entity may re-transmit CB0 and CB1 and transmit CB4-CB7 in slot n+k1 215-*b* as code blocks 225.

The UE may receive the transmissions in slot n+k1 215-*b*. In this example, the UE is able to successfully decode everything but CB0, CB4, and CB7. The network entity may start the next slot n+k2 215-*c* with re-transmissions of CB0, CB4, and CB7, and then transmit CB8 through CB11 as code blocks 230. That is, a small portion may be dedicated for re-transmission of the failed parity bits from the failed code blocks and the remaining resources may be used for new code blocks. The last code block, such as CB11, may not have the same number of resources as the other code blocks. In situations where some code blocks fail and some succeed, the next slots may include a mixture of multiple code blocks, where each of them is related to a new transmission number, they may need different numbers of resources, and they may have different time and frequencies.

The graph 200 illustrates the PDSCH in frequency 205 and time 210 but not the corresponding PDCCH. A dedicate symbol may be included in the beginning of each slot 215 for control. The network entity or UE may configure a system parameter to determine how many symbols at the beginning of each slot 215 that the DCI will occupy (e.g., 1, 2, or 3 symbols at the beginning of the slot 215). The UE may scan the PDCCH symbols for whether a DCI is sent to it, and if so, the UE may decode the DCI and process the PDSCH accordingly.

As shown, MIRS may result in a complex scheduling with many code blocks, and each of them may be started at different times in different slots. The DCI would have to describe the complex structure so the UE can properly decode the message, which may require a lot of resources.

Techniques described herein provide a new format for DCI signaling that may be used with MIRS that reduce the size of the DCI. The new DCI format may result in significant performance gains because it has a reduced payload for re-transmission parameters. This enables a reduction in the PDCCH resources used to transmit the DCI.

The DCI format may omit information related to transport blocks in re-transmissions by instead signaling the re-transmission policy and indicating feedback received. For example, a network entity may signal a re-transmission scheduling policy to a UE. The re-transmission scheduling policy may be transmitted via an RRC or MAC-CE, for example. If the UE knowns what re-transmissions scheduling policy the network entity is using, then the UE will know the structure the network entity will use in the re-transmission. The network entity can signal the re-transmissions scheduling policy that it is going to use. The re-transmissions scheduling policy may reference preconfigured re-transmission scheduling policies or may send an RRC message with a very low periodicity to the UE. The message may indicate the parameters that the network entity will use for transmission. This enables the DCI to not have to carry this information because the re-transmission scheduling policy will already be known to the UE.

As the re-transmission scheduling policy of the network entity may change with a low periodicity, the network entity may indicate to the UE all of the relevant parameters of the re-transmission. These parameters may include, for example, a code block ordering in a time and frequency grid, a redundancy version include policy, a number of resources allocated per re-transmission, and a maximum number of re-transmissions. In some examples, the number of resources allocated per re-transmission (of a code block) may be expressed as a percentage of the number of resources that were allocated for the code block at the first transmission. The redundancy version per code block may indicate which coding bits are expected to be in which re-transmission. Any combination or sub-set of these parameters may be signaled in the re-transmission scheduling policy. In other examples, other parameters may be signaled in the re-transmission scheduling policy.

By providing the re-transmission scheduling policy with these parameters, they may not need to be transmitted in DCI along with the re-transmissions. Therefore, all of the parameters that are conventionally transmitted in DCI can be omitted when the network entity indicates the re-transmission scheduling policy to the UE.

Some of these parameters may be based on UE feedback per code block, such as the redundancy version include policy and the number of resources allocated per re-transmission.

In rare cases when the network entity may choose to select different parameters, it may use a legacy DCI format. The network entity may send a re-transmission using the legacy DCI format. If the UE detects the legacy DCI format, then the UE may overrule the re-transmission scheduling policy according to having received the legacy DCI format. That is, the UE may use the parameters indicated in the legacy DCI format to decode the re-transmission for the associated code blocks. In some examples, the first format of the DCI may be a legacy or conventional format. The first format may include one or more parameters including the code block ordering in the time and frequency grid, the redundancy version include policy, the number of resources allocated per re-transmission, and the maximum number of re-transmissions.

This capability to override the re-transmission scheduling policy may provide the network entity with the flexibility to change one of the parameters for a short period of time. The network entity could retain this flexibility by using the legacy format in which all of the parameters are exposed in the DCI instead of the compact DCI format described herein.

The network entity may also indicate to the UE the acknowledgement information from the UE as it was received by the network entity. For example, the UE may send acknowledgement information to the network entity to inform the network entity of a reception status of the transmitted code blocks as part of the UCI. The acknowledgement information may include acknowledgments (ACKs) or negative acknowledgments (NACKs) for the one or more code blocks or for parity bits of the code blocks. However, the network entity may not correctly receive or interpret the acknowledgement information. Because the re-transmissions are based on the code blocks that were not successfully received or decoded at the UE, if the network entity misunderstands which code blocks failed, the re-transmission may be inaccurate. As the ACK/NACK information signaled by the UE may be incorrectly interpreted by the network entity, and ruin the coherency of the re-transmission mechanism, the network entity may echo the ACK/NACK status as received by the network entity, and to which the re-transmission is performed.

This check may be performed by directly signaling the received ACK/NACK per code block or via a CRC or hash function status of a UCI message in a confirmation signal. In some examples, the direct signaling in the confirmation signal of the ACK/NACK per code block may be used when there is a relatively small number of code blocks transmitted. In other examples, the CRC or hash function status signaling may be used when there are relatively large numbers of code blocks. The confirmation signal may be signaled as part of the DCI, which may be send in a next re-transmission. This technique may be used to improve performance when the UCI is not reliable enough to meet performance requirements.

Using these two mechanisms will allow the UE to track the re-transmission parameters in a differential manner.

Figure 3:
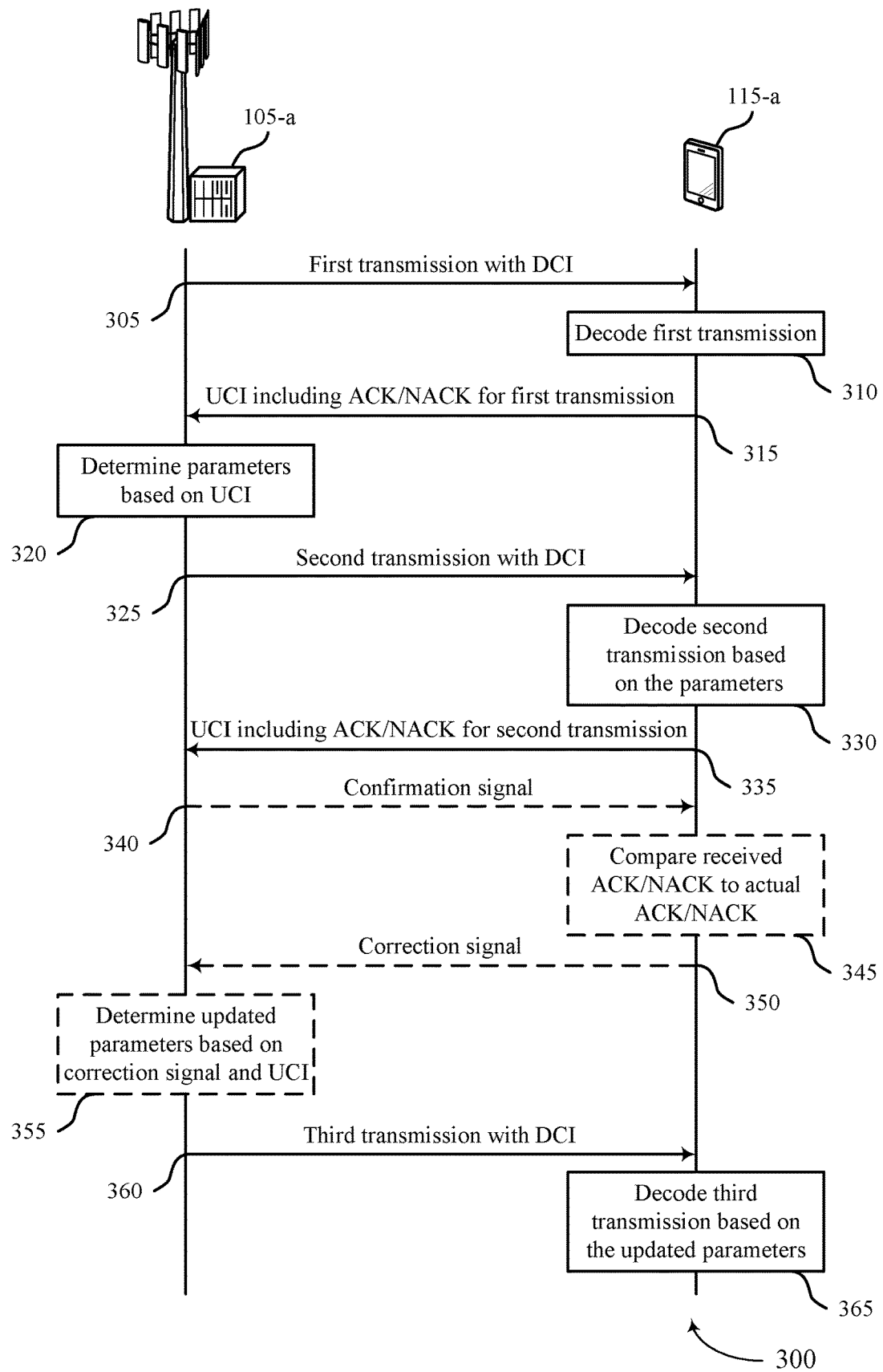
FIG. 3 illustrates an example of a process flow that supports a DCI format for PDSCH scheduling for MIRS in accordance with one or more aspects of the present disclosure.

FIG. 3 illustrates an example of a process flow 300 that supports a DCI format for PDSCH scheduling for MIRS in accordance with one or more aspects of the present disclosure. The process flow 300 may be between a network entity 105-a and a UE 115-a. The network entity 105-a and the UE 115-a may be examples of one or more aspects of a network entity 105 and a UE 115 as described herein, respectively. In some cases, the UE 115-a and the network entity 105-a may implement techniques described herein for re-transmission scheduling policy and DCI format.

In the example of FIG. 3, the UE 115-a may be aware that the network entity 105-a supports the new DCI format and the re-transmission scheduling policy. The network entity 105-a may have directly signaled the re-transmission scheduling policy to the UE 115-a, the UE 115-a may infer it from previous signaling, or the UE 115-a may infer it from DCI received from the network entity 105-a. In some examples, the UE 115-a may signal to the network entity 105-a that it supports the new DCI format.

The network entity 105-a may transmit a first transmission with DCI 305 to the UE 115-a. The first transmission may be, for example, a first set of code blocks in a first slot, such as slot n 215-a of FIG. 2. At 310, the UE 115-a may decode the first transmission based on the DCI information. The UE may determine which code blocks succeeded and which failed, and send the feedback of the acknowledgement information in a UCI 315.

At 320, the network entity 105-a may determine one or more parameters for the re-transmission scheduling policy based at least in part on the UCI information. In particular, the one or more parameters may be determined based at least in part on the ACK/NACK status of the code blocks from the first transmission. The network entity 105-a may then perform a re-transmission of any code blocks that failed, plus any additional new code blocks given available resources, as a second transmission with DCI 325 to the UE 115-a. DCI information may be included in the beginning symbols of the re-transmission. The DCI information may be according to the new format described herein. The UE 115-a may decode the second transmission (the first re-transmission) according to the parameters at 330. The UE 115-a may send a second UCI 335 including feedback information (acknowledgment information) for the second transmission 325.

In some examples, the network entity 105-a may send a confirmation signal 340 to the UE 115-a in order to inform the UE 115-a of which code blocks the network entity 105-a believed failed at the UE 115-a. That is, the network entity 105-a may indicate, to the UE 115-a, the acknowledgement information from the UE 115-a as it was received by the network entity 115-a. Because the re-transmissions are based on the code blocks that were not successfully received or decoded at the UE 115-a, if the network entity 105-a is incorrect about which code blocks the UE 115-a was unable to receive, the re-transmission may be inaccurate. The network entity 105-a may echo the ACK/NACK status as it received back to the UE 115-a in order to improve fidelity.

The confirmation signal 340 may directly signal the received ACK/NACK per code block or indicate a CRC or hash function status of the UCI message 335. In some examples, the confirmation signal 340 may be signaled as part of the DCI, which may be send in a next re-transmission.

The UE 115-a may compare the received ACK/NACK to the actual ACK/NACK at 345. The UE 115-a may send a correction signal 350 to the network entity 105-a that indicates whether the network entity 105-a was correct or not regarding the ACK/NACK status of the code blocks. In some examples, the UE 115-a may send the second UCI 335 and the correction signal 350 as one signal.

At 355, the network entity 105-a may determine updated parameters based on the UCI 335 for the second transmission 325 or based on the correction signal 350. The network entity 105-a may transmit a third transmission with DCI 360, which may include any re-transmissions for code blocks that failed from the second transmission 325. If none of the code blocks from the second transmission 325 failed, then the third transmission 360 may include only new code blocks. At 365, the UE 115-a may decode the third transmission 360 based on the updated parameters in the DCI and the re-transmission scheduling policy.

Figure 4:
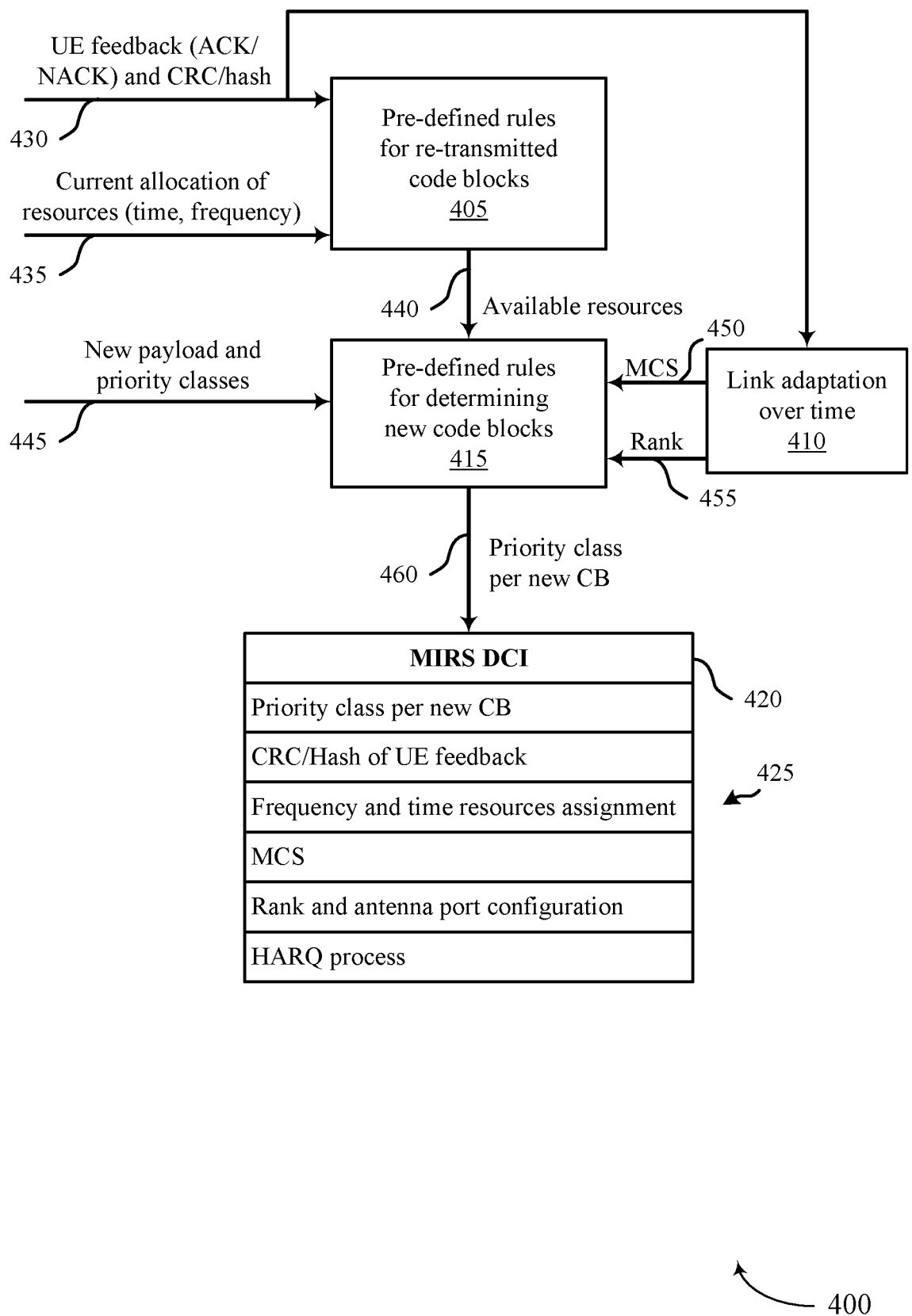
FIG. 4 illustrates an example of a block diagram that supports a DCI format for PDSCH scheduling for MIRS in accordance with one or more aspects of the present disclosure.

FIG. 4 illustrates an example of a block diagram 400 that supports a DCI format for PDSCH scheduling for MIRS in accordance with one or more aspects of the present disclosure. The block diagram 400 provides a conceptual framework for the re-transmission scheduling policy. A network entity or a UE may utilize concepts from the block diagram when implementing the techniques described herein.

The block diagram 400 includes pre-defined rules for re-transmitted code blocks 405. The pre-defined rules may refer to the re-transmission scheduling policy. These pre-defined rules may be known at the network entity and the UE. In some examples, the pre-defined rules may be known at one of the network entity or the UE, and signaled to the other. Inputs 430 and 435 may be provided to determine the pre-defined rules at block 405. Inputs 430 may include UE feedback (ACK/NACK status for previously transmitted code blocks) or CRC or hash function related to the code blocks. Inputs 435 may include a current allocation of resources (e.g., time and frequency available).

The pre-defined rules may be associated with the pre-defined rules for determining new code blocks at block 415 via the available resources 440. The pre-defined rules for determining the new code blocks may also be based on any new payload and priority classes of the payload at input 445. Additionally, the pre-defined rules for determining the new code blocks may be based on link adaptation over time 410. To further reduce the control signaling, parameters that may be determined based on CSI reports such as a rank 450 or a precoder resource group (PRG) size 455 may not be associated with a specific transport block, but rather associated with the slot in which they were applied. From this slot, these parameters may be applied to all of the code blocks, whether the code blocks are at a first transmission or are a re-transmission. The rank 450 may be defined explicitly or as an acknowledgement for a UE request.

A setting may be kept until the next update of these parameters. That is, all of the code blocks in the slots may have these parameters applied until there is an update to the rank 450 or to the PRG size 455. If, for example, because of a CSI report from a certain slot, the network entity wants to indicate to the UE that it is going to use a different rank, the network entity may not have to send the rank for each transport block because many transport blocks may be sent in parallel. The network entity may send the rank 450 only once, and the UE applies the rank 450 from that slot onward.

In some examples, the network entity may exclude some code blocks from using the new setting, by using a dedicated DCI message to specify the list of the excluded code blocks. A dedicated DCI message may be used for the exclusion. In some examples, there may also be a dedicated DCI message that may specify an exclusion list for some code blocks to be excluded from the re-transmission policy.

The DCI format described herein may also include an indication, per new code block (e.g., the first transmission of the code block), of its latency priority. Because different code blocks may have different latency, indicating the latency priority of one or more code blocks may enable the re-transmission scheduling policy to boost the re-transmission of code blocks with low latency requirements. The pre-defined rules for determining the new code blocks may use a priority class per new code block 460 to determine the MIRS DCI 420.

The pre-defined rules for determining the new code blocks 415 may be associated with the MIRS DCI 420. The MIRS DCI 420 may include one or more parameters 425. The one or more parameters 425 may include a priority class per new code block, a CRC or hash function of the UE feedback, the frequency and time resources assignment, the antenna port configuration, and a HARQ process. That is, parameters described in FIG. 4 that may be part of the MIRS DCI 420 include the CRC or hash function, the priority classes, the MCS, the rank, the frequency and time resources assignment, the antenna port configuration, and a HARQ process. In some examples, the MCS, rank, and antenna port configuration are not part of the MIRS DCI 420. In some examples, the antenna port configuration may be static and the MCS and rank may be updated via the link adaptation process.

Table 1 provides a chart showing possible fields of a MIRS DCI 420 format. Table 1 lists conventional MIRS requirements and the DCI format as proposed herein. Other parameters the DCI may include are frequency domain resource assignment, time domain resource assignment, and a HARQ process number. These may remain unchanged from MIRS to the new DCI format. In other examples, other parameters may be included or omitted.

TABLE 1

| Field | MIRS requirements | New DCI format |
|---|---|---|
| Modulation and coding scheme (MCS) | Mix of various MCS might exist - new code blocks and re-transmitted code blocks in the same allocation - more bits may be required in naive implementation | Re-transmitted code blocks may have added redundancy based on UE request and pre-defined rules - omitted from new DCI format New code blocks use common MCS (determined by network entity based on CSI-RS + outer loop link adaption (OLLA) process) - signaling once per allocation |
| New data indicator | Mix of new code blocks and re-transmitted code blocks in the same allocation - more bits required | Eliminated - the block mix is determined by UE feedback, pre-defined rules and new MCS indication |
| Redundancy version (RV) | Mix of re-transmitted blocks, each can use different RV - more bits required | Eliminated - RV determined based on pre-defined rules and UE last feedback |
| PDSCH-to-HARQ_feedback timing indicator | Continuous feedback changes the feedback timeline - new interpretation of this field required | Eliminated - based on pre-defined rules taking into account allocation size, number of current code blocks, etc. |

TABLE 1-continued

| Field | MIRS requirements | New DCI format |
|---|---|---|
| CBG transmission information (CBGTI) | ACK/NACK to be sent per block - therefore thenumber of bits increase significantly | Eliminated - implicitly known based on UE last feedback of ACK/NACK and pre-defined rules |
| Antenna port(s) and number of layers | Dynamic rank adaptation | Assumed once per allocation |
| Priority per code block | Does not exist in legacy DCI - new for MIRS - determines scheduling and amount of additional redundancy per re-transmission based on pre-defined rules | New field in DCI, e.g., 2 bits (4 levels of priority) per new code block. The number of new code blocks may be small. Could also group new code blocks to priority classes and signal priority per class. |
| UE feedback acknowledgement | Does not exist in legacy DCI - new for MIRS | New field in DCI - indicates that the network entity correctly received UE ACK/NACK/G2C feedback and UE can interpret the content of the current DCI based on that information and the pre-defined rules |

As seen from Table 1, the techniques described herein include many opportunities for reducing the overhead of the DCI.

The signaling of the DCI format is described herein. The UE may indicate to the network entity that it supports the new DCI format. The network entity may indicate to the UE the re-transmission scheduling policy for re-transmission of transport blocks. The re-transmission parameters may include a code block ordering at a time/frequency grid, a redundancy version increase policy, a number of resources allocated per re-transmission, and a maximum number of re-transmissions. The indication of the re-transmission scheduling policy may be done by direct indication of the re-transmission parameters or as index to predefined sets of re-transmission parameters. The indications may be communicated using MAC-CE or RRC message.

The network entity may indicate to the UE, using the DCI, the ACK/NACK indications as received by the UCI, and according to which the network entity will apply the re-transmission policy. The network entity may indicate to the UE, using the DCI, the CRC status (e.g., pass/fail) of the detected UCI, and according to which the network entity will apply the re-transmission policy. The network entity may indicate, to the UE, the CSI related parameters that may be applied to all of the code blocks (except for any excluded code blocks). The network entity may indicate, to the UE, the latency priority per new code block. The network entity may indicate, to the UE, a list of code blocks to be excluded from applying the CSI related parameters.

In some examples, an indication of the re-transmission scheduling policy may be signaled using an RRC message. The re-transmissions scheduling policy may change with very low periodicity or it may infrequently change. The indication of the predefined rules for the new code blocks may also change infrequently or with low periodicity and may be sent using an RRC message. The indication of the re-transmission scheduling policy and the indication of the predefined rules for the new code blocks may be sent in a single message. The new format of DCI message may be transmitted from the network entity to the UE and is used to schedule slot-based transmissions using a reduced parameters version of the legacy DCI (as some of the re-transmission parameters may be interpreted by the UE based at least partially on the scheduling policy and the ACK/NACK status).

Figure 5:
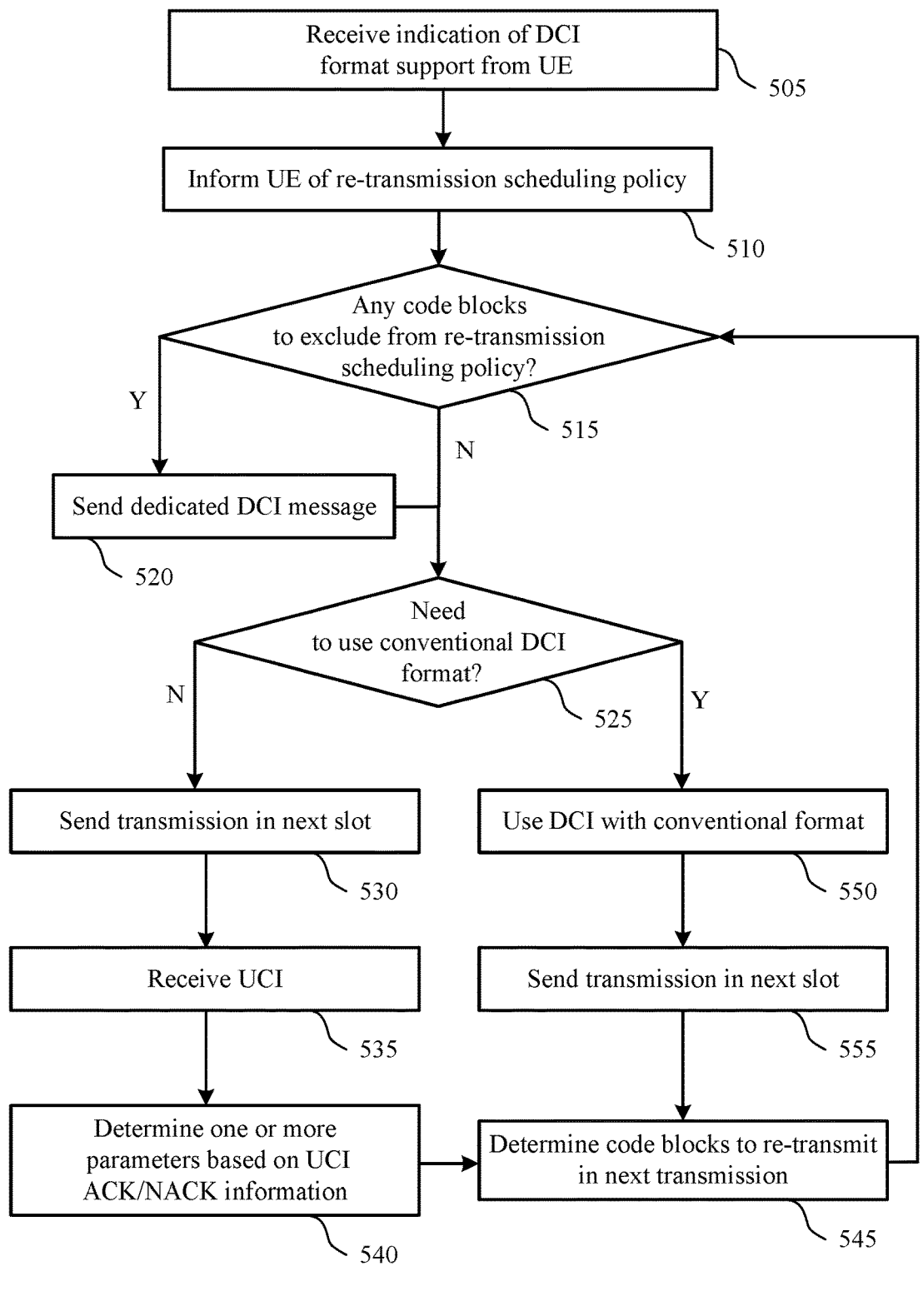
FIG. 5 illustrates a flowchart of a method that supports a DCI format for PDSCH scheduling for MIRS in accordance with one or more aspects of the present disclosure.

FIG. 5 illustrates a flowchart of a method 500 that supports a DCI format for PDSCH scheduling for MIRS in accordance with one or more aspects of the present disclosure. The operations of the method 500 may be implemented by a network entity or its components as described herein. For example, the operations of the method 500 may be performed by a network entity 105 as described with reference to FIGS. 1 through 4. In some examples, a network entity may execute a set of instructions to control the functional elements of the network entity to perform the described functions. Additionally, or alternatively, the network entity may perform aspects of the described functions using special-purpose hardware.

The method 500 may include receiving an indication of support of the DCI format from the UE at 505. In some examples, the indication of support may specifically indicate support of the re-transmission scheduling policy or that the UE is capable of supporting different re-transmission policies. At 510, the network entity may send the re-transmission scheduling policy to the UE.

At 515, the network entity may determine whether there are any code blocks to exclude from the re-transmission scheduling policy. That is, the code blocks may be excluded from the CSI related parameters. If so, the method 500 proceeds to 520 and sends the UE a dedicated DCI message that indicates the excluded code blocks or provides DCI information for decoding those code blocks. If not, the method 500 proceeds to 525.

At 525, the network entity may determine whether it needs to use a legacy or conventional DCI format instead of a DCI format as described herein. If the network does not need to use the conventional DCI format, the method 500 may send a transmission in a next available slot at 530, according to the re-transmission scheduling policy and any earlier received UCI or other channel information. The transmission may include only new code blocks (e.g., code blocks that haven't been transmitted to the UE yet), or may include re-transmissions of code blocks sent earlier.

At 535, the network entity may receive UCI from the UE that is based on the transmission. The UCI may include acknowledgement information for the code blocks in the transmission. The network entity may determine one or more parameters to update based on the UCI ACK/NACK information at 540. The network entity may determine which code blocks to re-transmit in the next transmission slot based on the UCI ACK/NACK information at 545.

If, at 525, the network entity determined that it did need to use the legacy DCI format, it may use the legacy DCI format at 550 and send the transmission in the next slot available at 555. That is, the network entity may send the same code blocks in the next available slot using the legacy DCI format at 555 or send it using the new DCI format at 530. Regardless of how the code blocks are sent, the network entity may determine which code blocks need re-transmission at 545.

The method 500 may continue to check for code block exclusions or the need to use the DCI format throughout sending re-transmissions of the failed code blocks and the new code blocks if there are resources available. The method 500 may continue until all the data is sent to the UE. In some examples, the method 500 may include some additional steps or less steps than those described herein. For example, the method 500 may only determine the code block exclusion or the convention DCI format once per set of transmissions or communication session.

Figure 6:
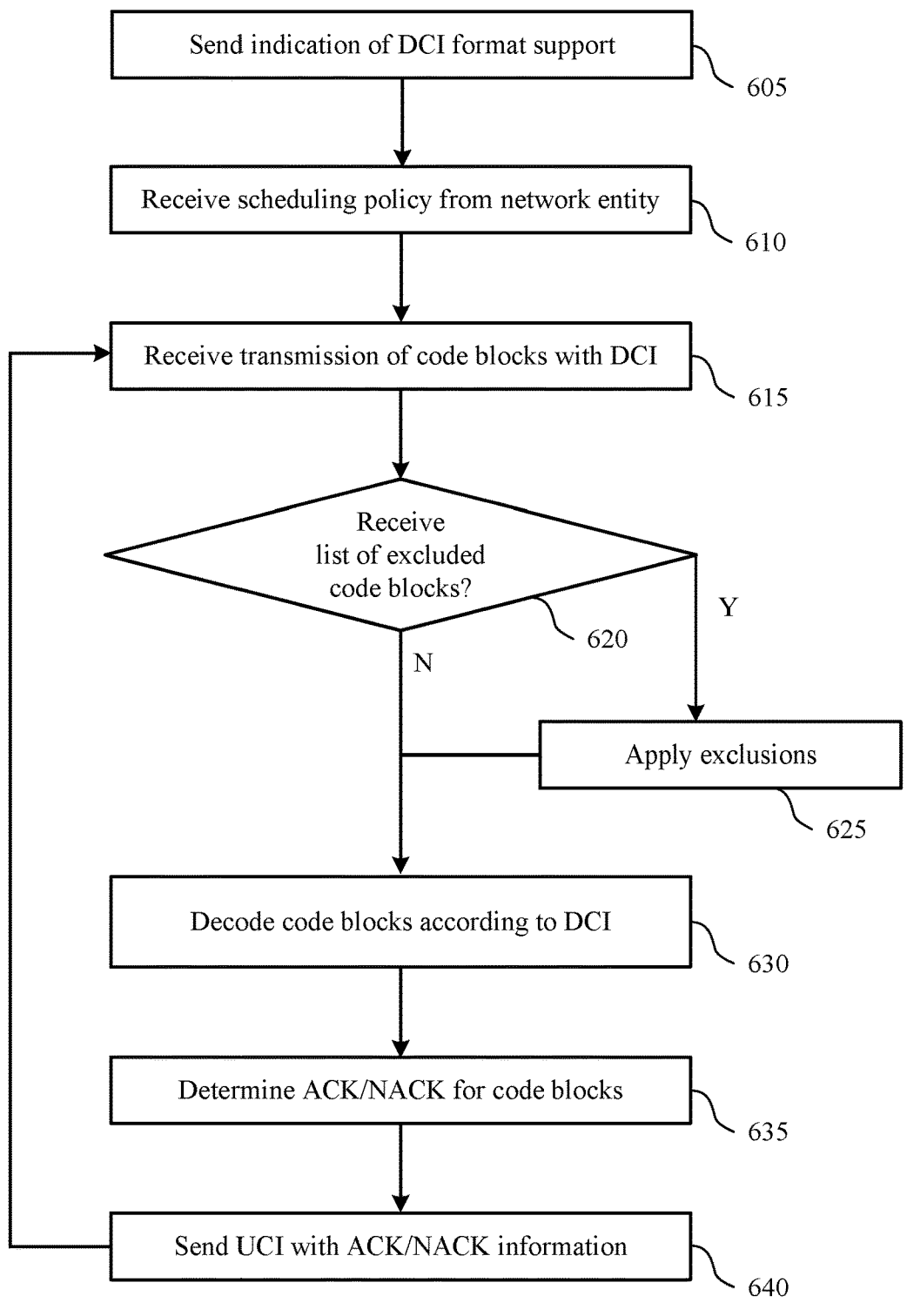
FIG. 6 illustrates a flowchart of a method that supports a DCI format for PDSCH scheduling for MIRS in accordance with one or more aspects of the present disclosure.

FIG. 6 illustrates a flowchart of a method 600 that supports a DCI format for PDSCH scheduling for MIRS in accordance with one or more aspects of the present disclosure. The operations of the method 600 may be implemented by a UE or its components as described herein. For example, the operations of the method 600 may be performed by a UE 115 as described with reference to FIGS. 1 through 4. In some examples, a UE may execute a set of instructions to control the functional elements of the UE to perform the described functions. Additionally, or alternatively, the UE may perform aspects of the described functions using special-purpose hardware.

The method 600 may include sending an indication of support of the new DCI format to the network entity at 605. In some examples, the indication of support may specifically indicate support of the re-transmission scheduling policy. At 610, the UE may receive the re-transmission scheduling policy from the network entity.

At 615, the UE may receive a transmission of code blocks along with DCI. At 620, the UE may determine if it received, from the network entity, a list of code blocks that are to be excluded from the CSI parameters. If so, the UE may apply the exclusions at 625 and the method 600 proceeds to 630. If not, the method 600 proceeds to 630.

At 630, the UE may decode the code blocks in the transmission according to the DCI, the exclusions, and the re-transmission scheduling policy. Some of the code blocks in the transmission may be re-transmitted code blocks and some may be new code blocks that have not been previously transmitted to the UE. At 635, the UE may determine ACK/NACK status for the code blocks. The UE may send UCI with the ACK/NACK information to the network entity at 640. The UE may receive a next transmission of code blocks with DCI information at 615 and repeat the next portion of the method 600.

Figure 7:
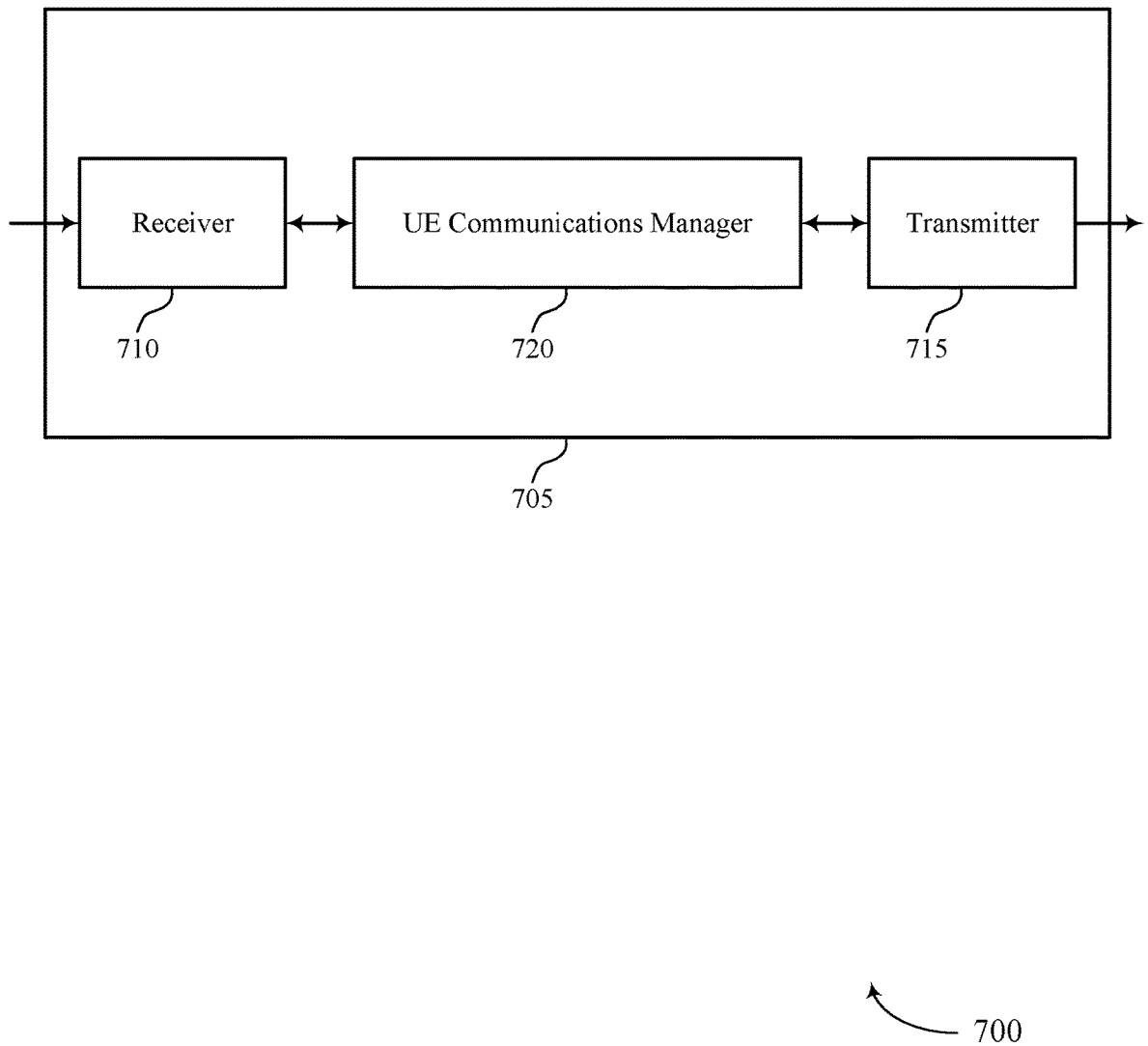
FIGS. 7 and 8 show block diagrams of devices that support a DCI format for PDSCH scheduling for MIRS in accordance with one or more aspects of the present disclosure.

FIG. 7 shows a block diagram 700 of a device 705 that supports a DCI format for PDSCH scheduling for MIRS in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to a new DCI format for PDSCH scheduling for MIRS). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to a new DCI format for PDSCH scheduling for MIRS). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of a new DCI format for PDSCH scheduling for MIRS as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device (PLD), a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 may be configured as or otherwise support a means for receiving, from a network entity, a first transmission of one or more code blocks in a first slot. The communications manager 720 may be configured as or otherwise support a means for transmitting, to the network entity, UCI that includes acknowledgement information for the one or more code blocks. The communications manager 720 may be configured as or otherwise support a means for receiving, from a network entity, a scheduling signal that indicates one or more parameters associated with a re-transmission scheduling policy based on the acknowledgement information. The communications manager 720 may be configured as or otherwise support a means for receiving a second transmission of at least a portion of the one or more code blocks in a second slot. The communications manager 720 may be configured as or otherwise support a means for decoding the second transmission of at least the portion of the one or more code blocks according to the re-transmission scheduling policy.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reduced processing, reduced use of PDCCH resources overhead, reduced the number of symbols used at the beginning of each slot for DCI, reduced power consumption, and more efficient utilization of communication resources.

Figure 8:
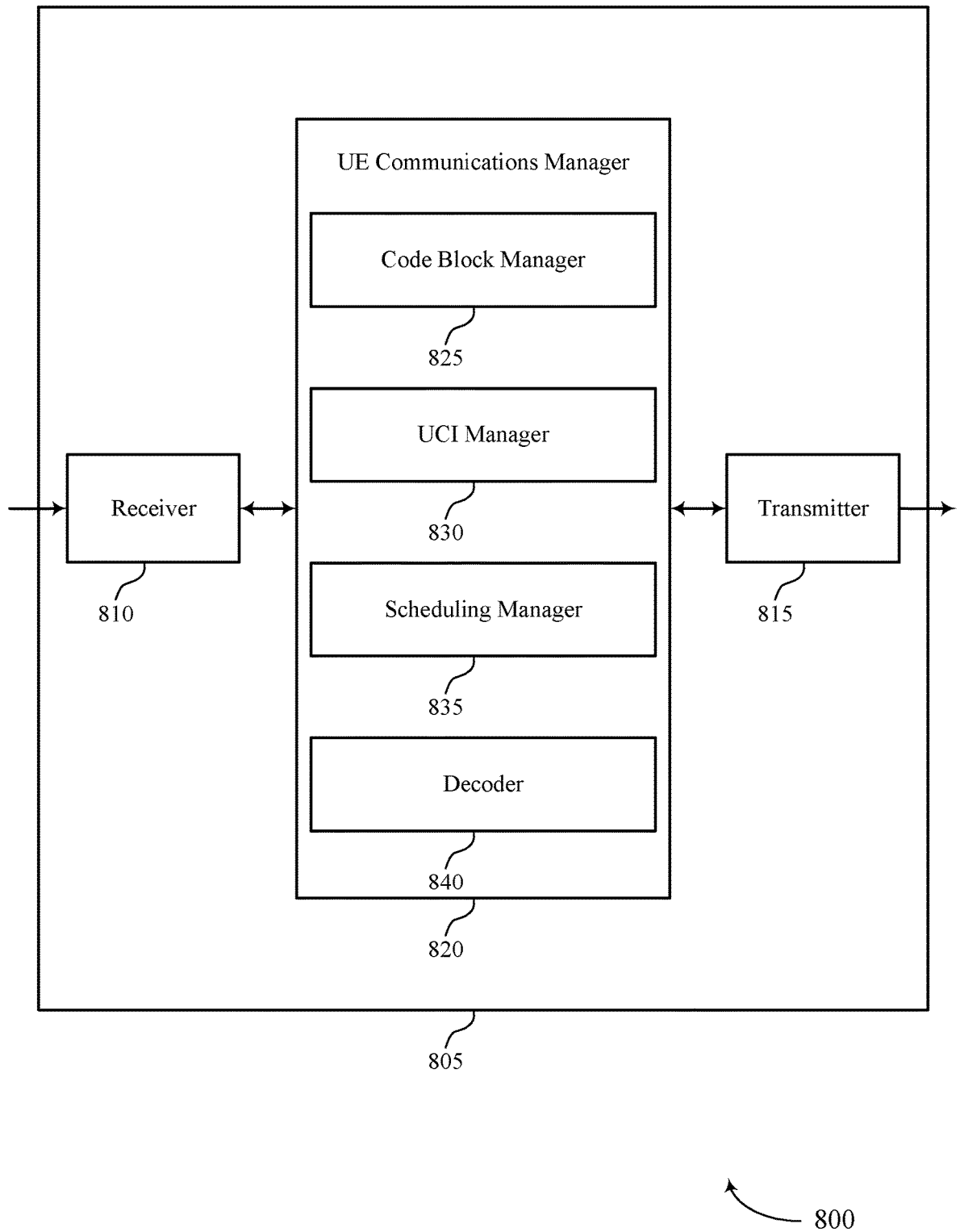

FIG. 8 shows a block diagram 800 of a device 805 that supports a new DCI format for PDSCH scheduling for MIRS in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to a new DCI format for PDSCH scheduling for MIRS). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to a new DCI format for PDSCH scheduling for MIRS). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of a new DCI format for PDSCH scheduling for MIRS as described herein. For example, the communications manager 820 may include a code block manager 825, a UCI manager 830, a scheduling manager 835, a decoder 840, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The code block manager 825 may be configured as or otherwise support a means for receiving, from a network entity, a first transmission of one or more code blocks in a first slot. The UCI manager 830 may be configured as or otherwise support a means for transmitting, to the network entity, UCI that includes acknowledgement information for the one or more code blocks. The scheduling manager 835 may be configured as or otherwise support a means for receiving, from a network entity, a scheduling signal that indicates one or more parameters associated with a re-transmission scheduling policy based on the acknowledgement information. The code block manager 825 may be configured as or otherwise support a means for receiving a second transmission of at least a portion of the one or more code blocks in a second slot. The decoder 840 may be configured as or otherwise support a means for decoding the second transmission of at least the portion of the one or more code blocks according to the re-transmission scheduling policy.

Figure 9:
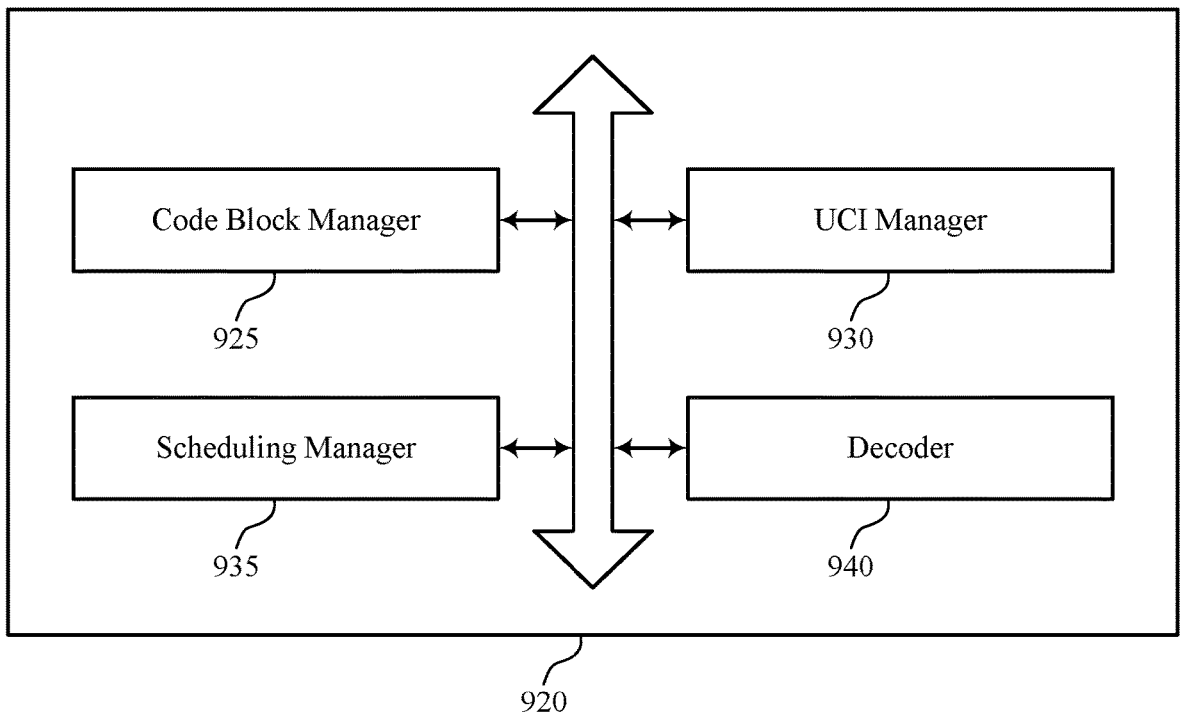
FIG. 9 shows a block diagram of a communications manager that supports a DCI format for PDSCH scheduling for MIRS in accordance with one or more aspects of the present disclosure.

FIG. 9 shows a block diagram 900 of a communications manager 920 that supports a new DCI format for PDSCH scheduling for MIRS in accordance with one or more aspects of the present disclosure. The communications manager 920 may be an example of aspects of a communications manager 720, a communications manager 820, or both, as described herein. The communications manager 920, or various components thereof, may be an example of means for performing various aspects of a new DCI format for PDSCH scheduling for MIRS as described herein. For example, the communications manager 920 may include a code block manager 925, a UCI manager 930, a scheduling manager 935, a decoder 940, or any combination thereof. Each of these components may communicate, directly or indirectly, with one another (e.g., via one or more buses).

The communications manager 920 may support wireless communication in accordance with examples as disclosed herein. The code block manager 925 may be configured as or otherwise support a means for receiving, from a network entity, a first transmission of one or more code blocks in a first slot. The UCI manager 930 may be configured as or otherwise support a means for transmitting, to the network entity, uplink control information that includes acknowledgement information for the one or more code blocks. The scheduling manager 935 may be configured as or otherwise support a means for receiving, from a network entity, a scheduling signal that indicates one or more parameters associated with a re-transmission scheduling policy based on the acknowledgement information. In some examples, the code block manager 925 may be configured as or otherwise support a means for receiving a second transmission of at least a portion of the one or more code blocks in a second slot. The decoder 940 may be configured as or otherwise support a means for decoding the second transmission of at least the portion of the one or more code blocks according to the re-transmission scheduling policy.

In some examples, the UCI manager 930 may be configured as or otherwise support a means for receiving a confirmation signal that indicates received acknowledgement information on which the re-transmission scheduling policy is based.

In some examples, the UCI manager 930 may be configured as or otherwise support a means for comparing the acknowledgement information for the one or more code blocks to the received acknowledgement information from the confirmation signal. In some examples, the UCI manager 930 may be configured as or otherwise support a means for transmitting a correction signal that indicates that the received acknowledgement information is incorrect based on the received acknowledgement information not matching the ACK/NACK status of the one or more code blocks.

In some examples, the scheduling manager 935 may be configured as or otherwise support a means for receiving an updated scheduling signal that indicates one or more updated parameters based on the correction signal. In some examples, the decoder 940 may be configured as or otherwise support a means for receiving a third transmission of at least the portion of the one or more code blocks, where decoding the third transmission is further based on the one or more updated parameters.

In some examples, the confirmation signal indicates an ACK/NACK status per code block or a decoding status of the UCI.

In some examples, the re-transmission scheduling policy further includes an indication of a rank or a precoder resource group size. In some examples, the rank or the precoder resource group size is associated with the first slot or the second slot. In some examples, the one or more parameters associated with the re-transmission scheduling policy includes a code block ordering in time and frequency, a redundancy version increase policy, a number of resources allocated per re-transmission, or a maximum number of re-transmissions for a code block.

In some examples, the scheduling manager 935 may be configured as or otherwise support a means for receiving a dedicated downlink control information message that indicates a list of code blocks excluded from the re-transmission scheduling policy.

In some examples, the scheduling manager 935 may be configured as or otherwise support a means for receiving downlink control information having a format of a first type. In some examples, the scheduling manager 935 may be configured as or otherwise support a means for overriding the re-transmission scheduling policy based on the downlink control information.

In some examples, the re-transmission scheduling policy indicates a latency priority for the one or more code blocks. In some examples, to support receiving the scheduling signal, the scheduling manager 935 may be configured as or otherwise support a means for receiving the scheduling signal in a radio resource control message or a MAC control element.

Figure 10:
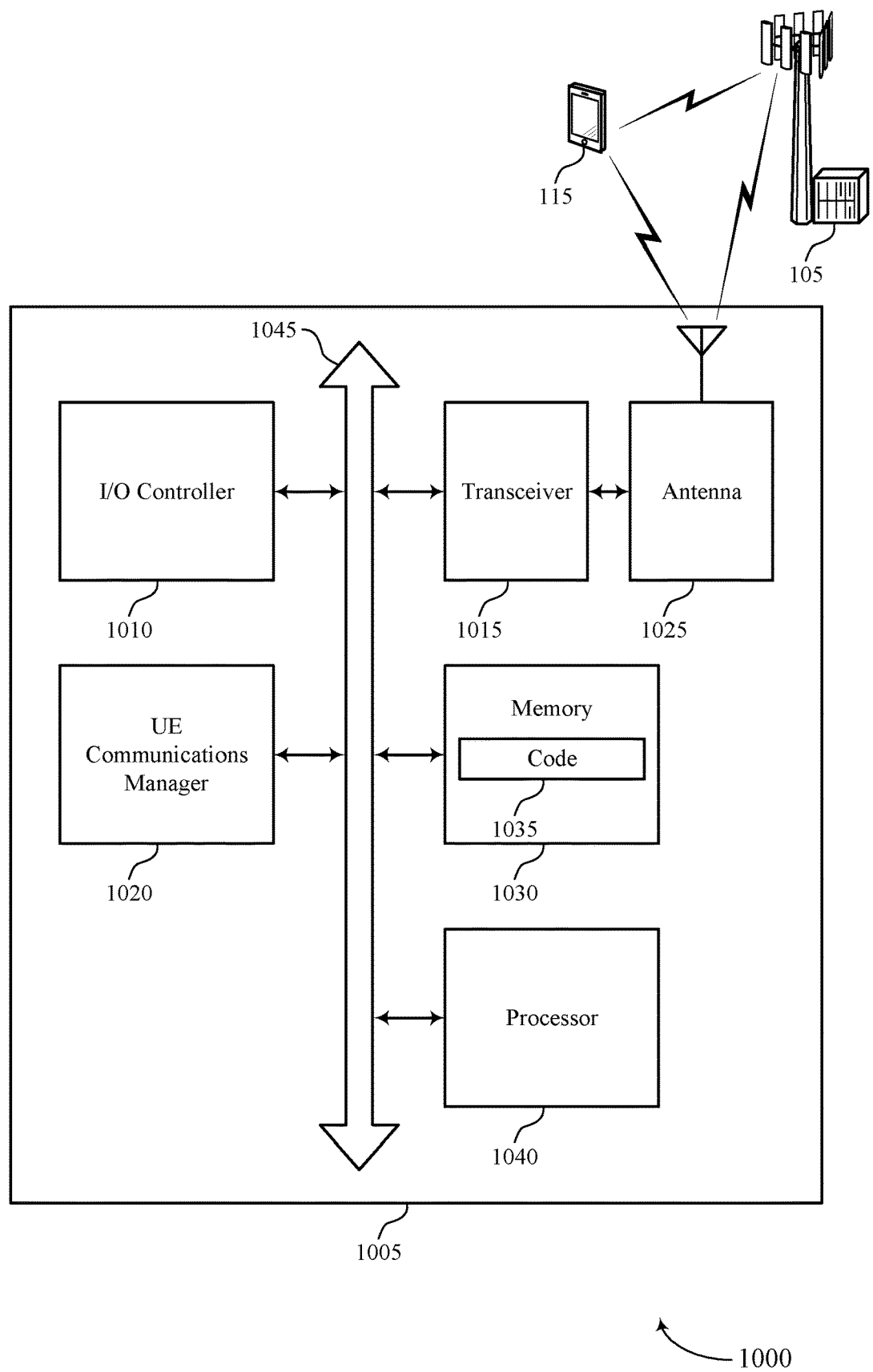
FIG. 10 shows a diagram of a system including a device that supports a DCI format for PDSCH scheduling for MIRS in accordance with one or more aspects of the present disclosure.

FIG. 10 shows a diagram of a system 1000 including a device 1005 that supports a new DCI format for PDSCH scheduling for MIRS in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting a new DCI format for PDSCH scheduling for MIRS). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication in accordance with examples as disclosed herein. For example, the communications manager 1020 may be configured as or otherwise support a means for receiving, from a network entity, a first transmission of one or more code blocks in a first slot. The communications manager 1020 may be configured as or otherwise support a means for transmitting, to the network entity, UCI that includes acknowledgement information for the one or more code blocks, where the acknowledgement information indicates an ACK/NACK status of the one or more code blocks. The communications manager 1020 may be configured as or otherwise support a means for receiving, from a network entity, a scheduling signal that indicates one or more parameters associated with a re-transmission scheduling policy based on the acknowledgement information. The communications manager 1020 may be configured as or otherwise support a means for receiving a second transmission of at least a portion of the one or more code blocks in a second slot. The communications manager 1020 may be configured as or otherwise support a means for decoding the second transmission of at least the portion of the one or more code blocks according to the re-transmission scheduling policy.

By including or configuring the communications manager 1020 in accordance with examples as described herein, the device 1005 may support techniques for improved communication reliability, reduced latency, improved user experience related to reduced processing, reduced power consumption, more efficient utilization of communication resources, and longer battery life.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of a new DCI format for PDSCH scheduling for MIRS as described herein, or the processor 1040 and the memory 1030 may be otherwise configured to perform or support such operations.

Figure 11:
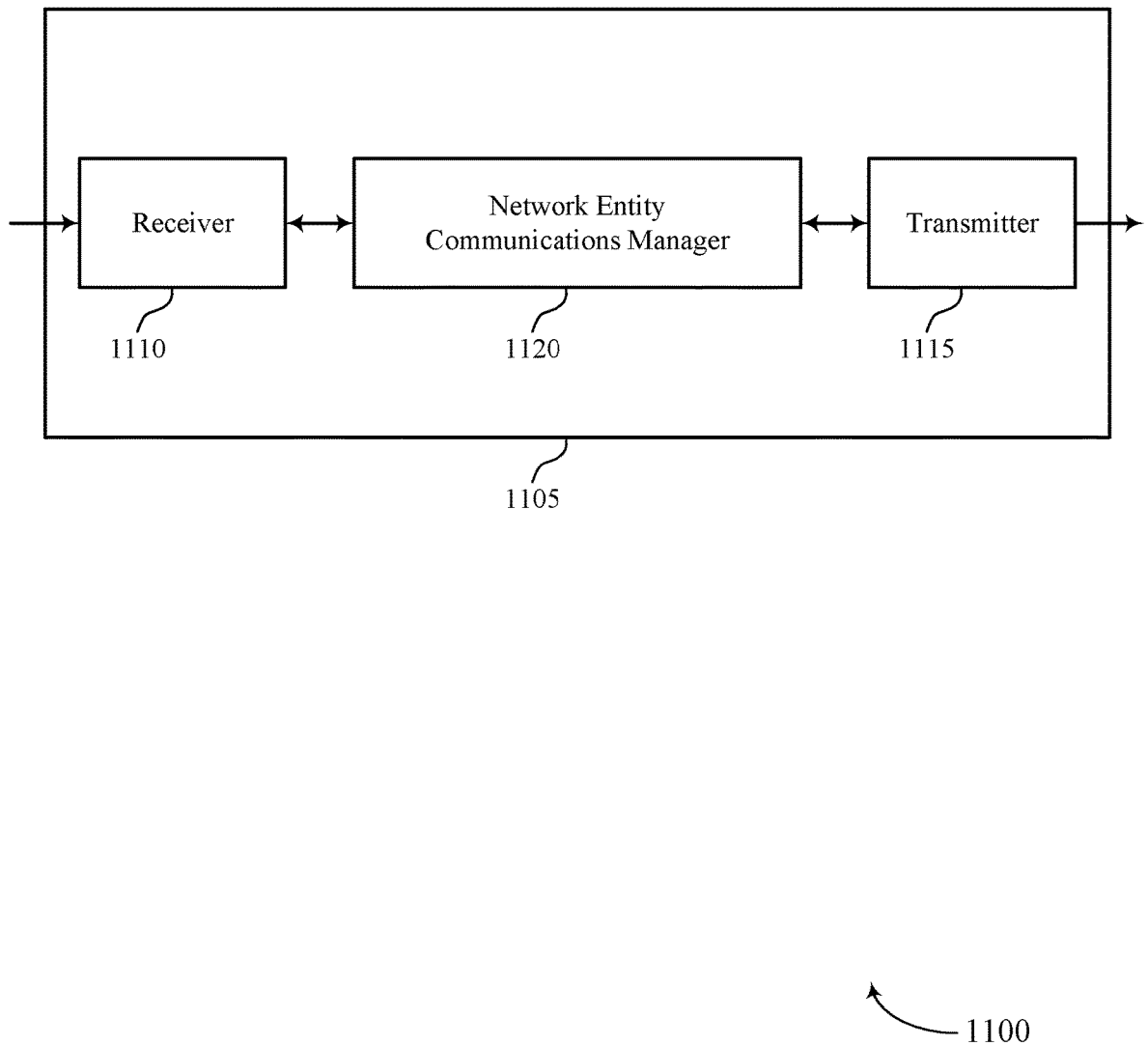
FIGS. 11 and 12 show block diagrams of devices that support a DCI format for PDSCH scheduling for MIRS in accordance with one or more aspects of the present disclosure.

FIG. 11 shows a block diagram 1100 of a device 1105 that supports a new DCI format for PDSCH scheduling for MIRS in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of a new DCI format for PDSCH scheduling for MIRS as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other PLD, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. For example, the communications manager 1120 may be configured as or otherwise support a means for transmitting, to a UE, a first transmission of one or more code blocks in a first slot. The communications manager 1120 may be configured as or otherwise support a means for receiving, from the UE, UCI that includes acknowledgement information for the one or more code blocks. The communications manager 1120 may be configured as or otherwise support a means for transmitting, to the UE, a scheduling signal that indicates one or more parameters associated with a re-transmission scheduling policy based on the acknowledgement information. The communications manager 1120 may be configured as or otherwise support a means for transmitting a second transmission of at least a portion of the one or more code blocks in a second slot.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced use of PDCCH resources overhead, reduced the number of symbols used at the beginning of each slot for DCI, reduced power consumption, and more efficient utilization of communication resources.

Figure 12:
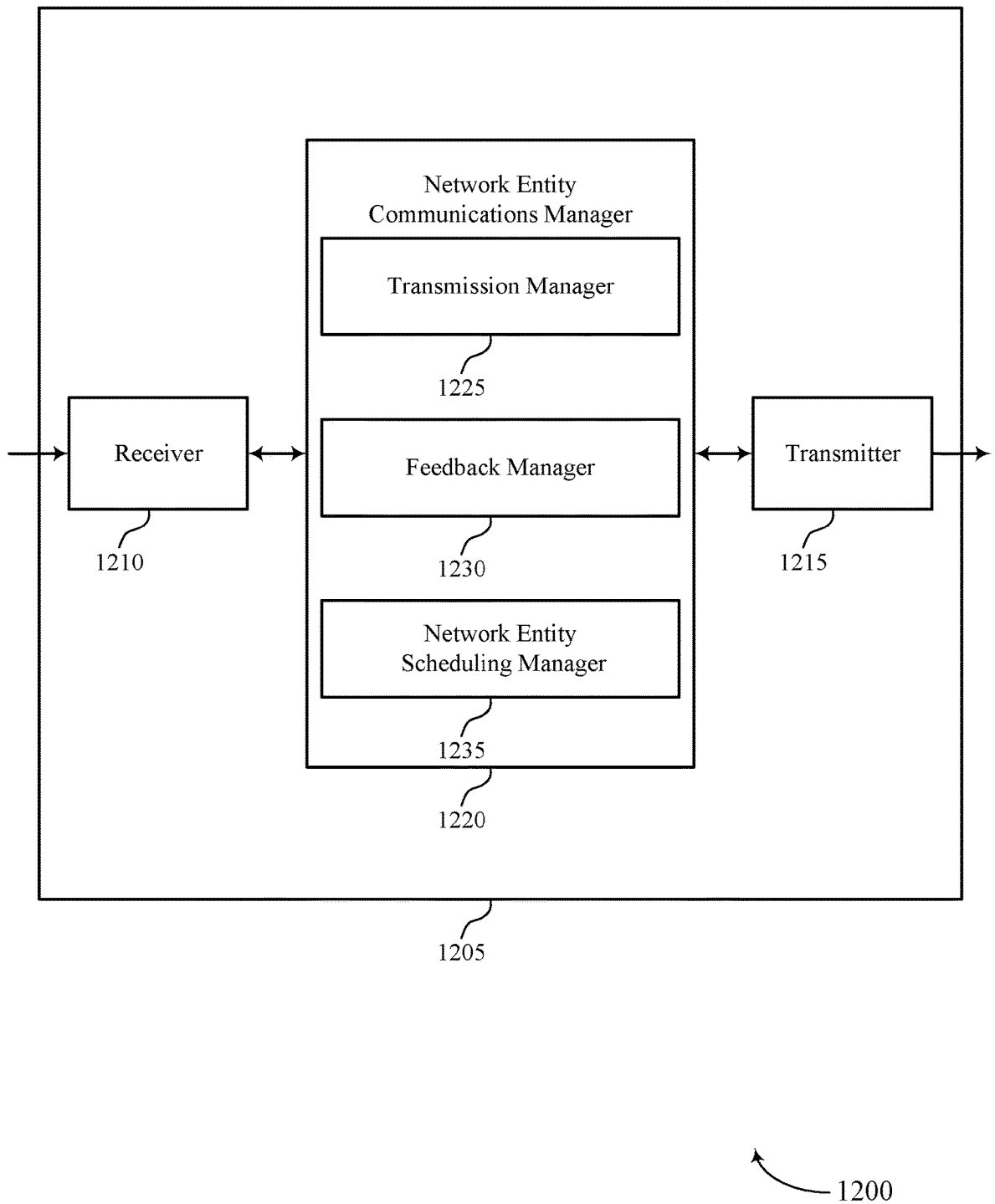

FIG. 12 shows a block diagram 1200 of a device 1205 that supports a new DCI format for PDSCH scheduling for MIRS in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of a new DCI format for PDSCH scheduling for MIRS as described herein. For example, the communications manager 1220 may include a transmission manager 1225, a feedback manager 1230, a network entity scheduling manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. The transmission manager 1225 may be configured as or otherwise support a means for transmitting, to a UE, a first transmission of one or more code blocks in a first slot. The feedback manager 1230 may be configured as or otherwise support a means for receiving, from the UE, UCI that includes acknowledgement information for the one or more code blocks, where the acknowledgement information indicates an ACK/NACK status of the one or more code blocks. The network entity scheduling manager 1235 may be configured as or otherwise support a means for transmitting, to the UE, a scheduling signal that indicates one or more parameters associated with a re-transmission scheduling policy based on the acknowledgement information. The transmission manager 1225 may be configured as or otherwise support a means for transmitting a second transmission of at least a portion of the one or more code blocks in a second slot.

Figure 13:
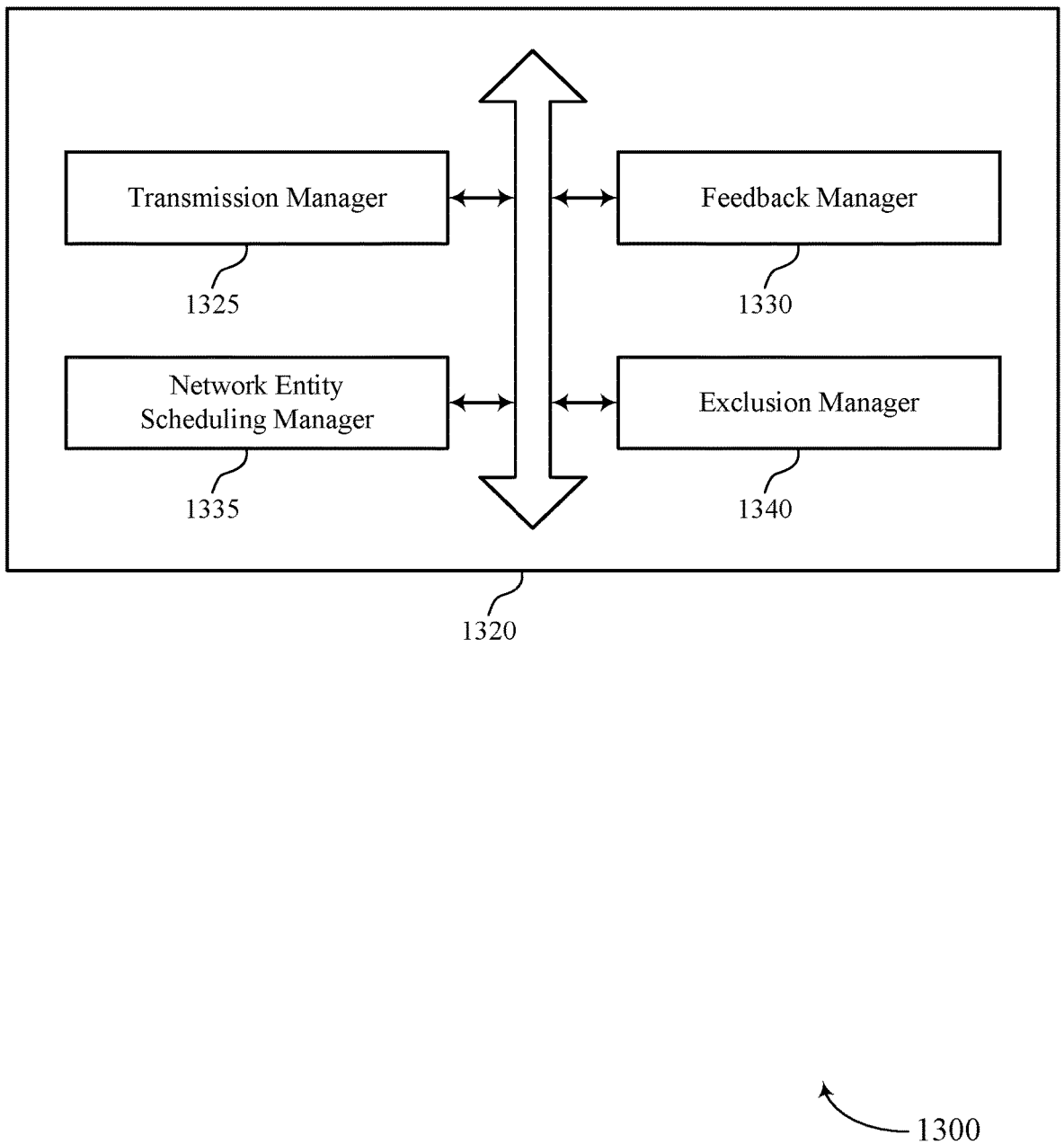
FIG. 13 shows a block diagram of a communications manager that supports a DCI format for PDSCH scheduling for MIRS in accordance with one or more aspects of the present disclosure.

FIG. 13 shows a block diagram 1300 of a communications manager 1320 that supports a new DCI format for PDSCH scheduling for MIRS in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of a new DCI format for PDSCH scheduling for MIRS as described herein. For example, the communications manager 1320 may include a transmission manager 1325, a feedback manager 1330, a network entity scheduling manager 1335, an exclusion manager 1340, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication in accordance with examples as disclosed herein. The transmission manager 1325 may be configured as or otherwise support a means for transmitting, to a UE, a first transmission of one or more code blocks in a first slot. The feedback manager 1330 may be configured as or otherwise support a means for receiving, from the UE, uplink control information that includes acknowledgement information for the one or more code blocks, where the acknowledgement information indicates an acknowledged or negative acknowledged status of the one or more code blocks. The network entity scheduling manager 1335 may be configured as or otherwise support a means for transmitting, to the UE, a scheduling signal that indicates one or more parameters associated with a re-transmission scheduling policy based on the acknowledgement information. In some examples, the transmission manager 1325 may be configured as or otherwise support a means for transmitting a second transmission of at least a portion of the one or more code blocks in a second slot.

In some examples, the feedback manager 1330 may be configured as or otherwise support a means for transmitting, to the UE, a confirmation signal that indicates the received acknowledgement information on which the re-transmission scheduling policy is based.

In some examples, the feedback manager 1330 may be configured as or otherwise support a means for receiving, from the UE, a correction signal that indicates that the received acknowledgement information is incorrect based on the received acknowledgement information not matching an actual ACK/NACK status of the one or more code blocks.

In some examples, the network entity scheduling manager 1335 may be configured as or otherwise support a means for transmitting, to the UE, an updated scheduling signal that indicates one or more updated parameters based on the correction signal. In some examples, the network entity scheduling manager 1335 may be configured as or otherwise support a means for transmitting a third transmission of at least the portion of the one or more code blocks.

In some examples, the confirmation signal indicates the ACK/NACK status per code block or a decoding status of the UCI. In some examples, the re-transmission scheduling policy further includes an indication of a rank or a precoder resource group size. In some examples, the rank or the precoder resource group size is associated with the first slot or the second slot.

In some examples, the one or more parameters associated with the re-transmission scheduling policy includes a code block ordering in time and frequency, a redundancy version increase policy, a number of resources allocated per re-transmission, or a maximum number of re-transmissions for a code block.

In some examples, the exclusion manager 1340 may be configured as or otherwise support a means for transmitting, to the UE, a dedicated downlink control information message that indicates a list of code blocks excluded from the re-transmission scheduling policy.

In some examples, the exclusion manager 1340 may be configured as or otherwise support a means for transmitting, to the UE, downlink control information having a format of a first type, where the re-transmission scheduling policy does not apply to a subset of the one or more code blocks based on the downlink control information.

In some examples, the re-transmission scheduling policy indicates a latency priority for the one or more code blocks. In some examples, to support transmitting the scheduling signal, the network entity scheduling manager 1335 may be configured as or otherwise support a means for transmitting, to the UE, the scheduling signal in a radio resource control message or a MAC control element.

Figure 14:
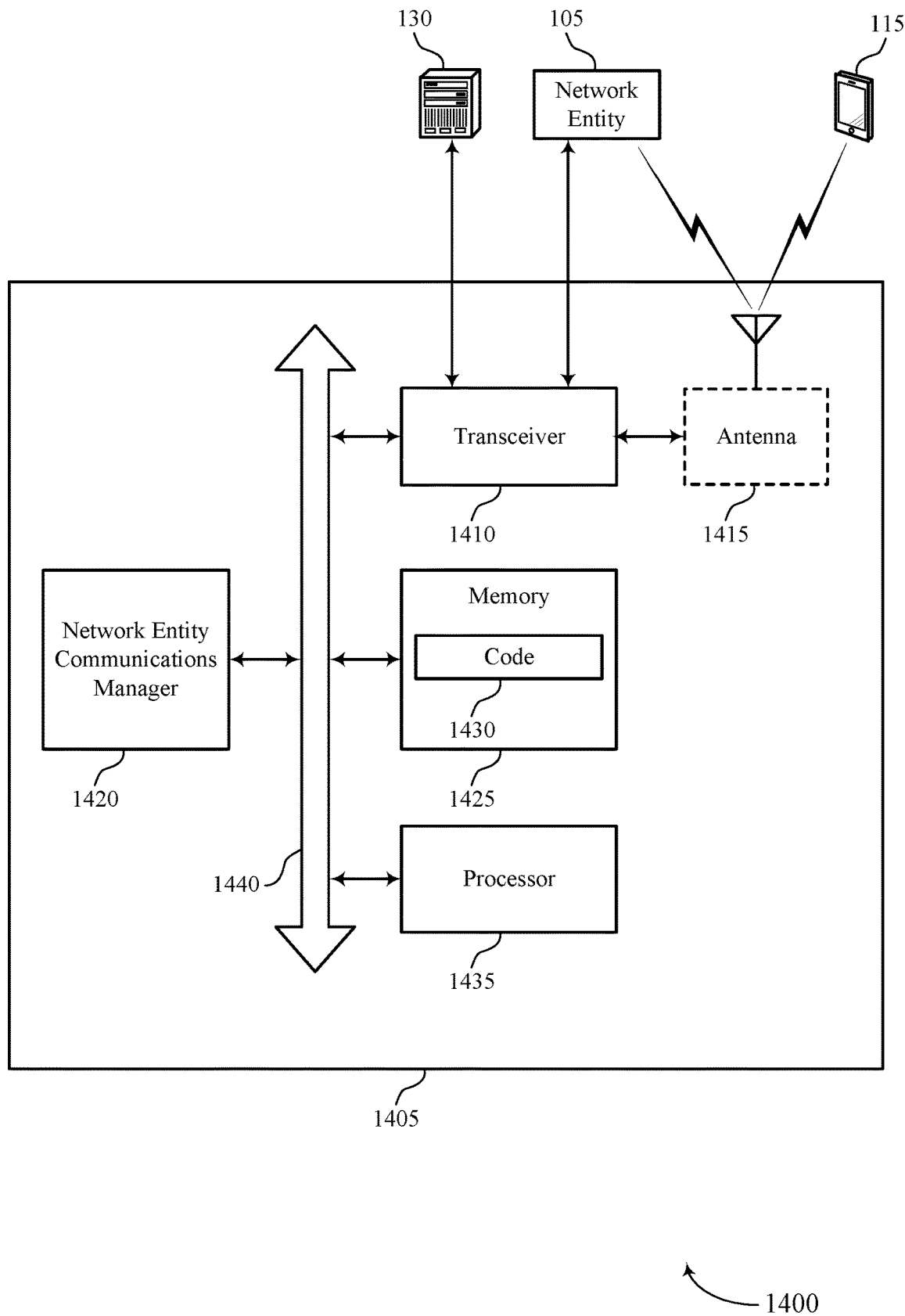
FIG. 14 shows a diagram of a system including a device that supports a DCI format for PDSCH scheduling for MIRS in accordance with one or more aspects of the present disclosure.

FIG. 14 shows a diagram of a system 1400 including a device 1405 that supports a new DCI format for PDSCH scheduling for MIRS in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a PLD, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting a new DCI format for PDSCH scheduling for MIRS). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication in accordance with examples as disclosed herein. For example, the communications manager 1420 may be configured as or otherwise support a means for transmitting, to a UE, a first transmission of one or more code blocks in a first slot. The communications manager 1420 may be configured as or otherwise support a means for receiving, from the UE, UCI that includes acknowledgement information for the one or more code blocks, where the acknowledgement information indicates an ACK/NACK status of the one or more code blocks. The communications manager 1420 may be configured as or otherwise support a means for transmitting, to the UE, a scheduling signal that indicates one or more parameters associated with a re-transmission scheduling policy based on the acknowledgement information. The communications manager 1420 may be configured as or otherwise support a means for transmitting a second transmission of at least a portion of the one or more code blocks in a second slot.

By including or configuring the communications manager 1420 in accordance with examples as described herein, the device 1405 may support techniques for improved communication reliability, reduced latency, improved user experience related to reduced processing, reduced power consumption, more efficient utilization of communication resources, and longer battery life.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of a new DCI format for PDSCH scheduling for MIRS as described herein, or the processor 1435 and the memory 1425 may be otherwise configured to perform or support such operations.

Figure 15:
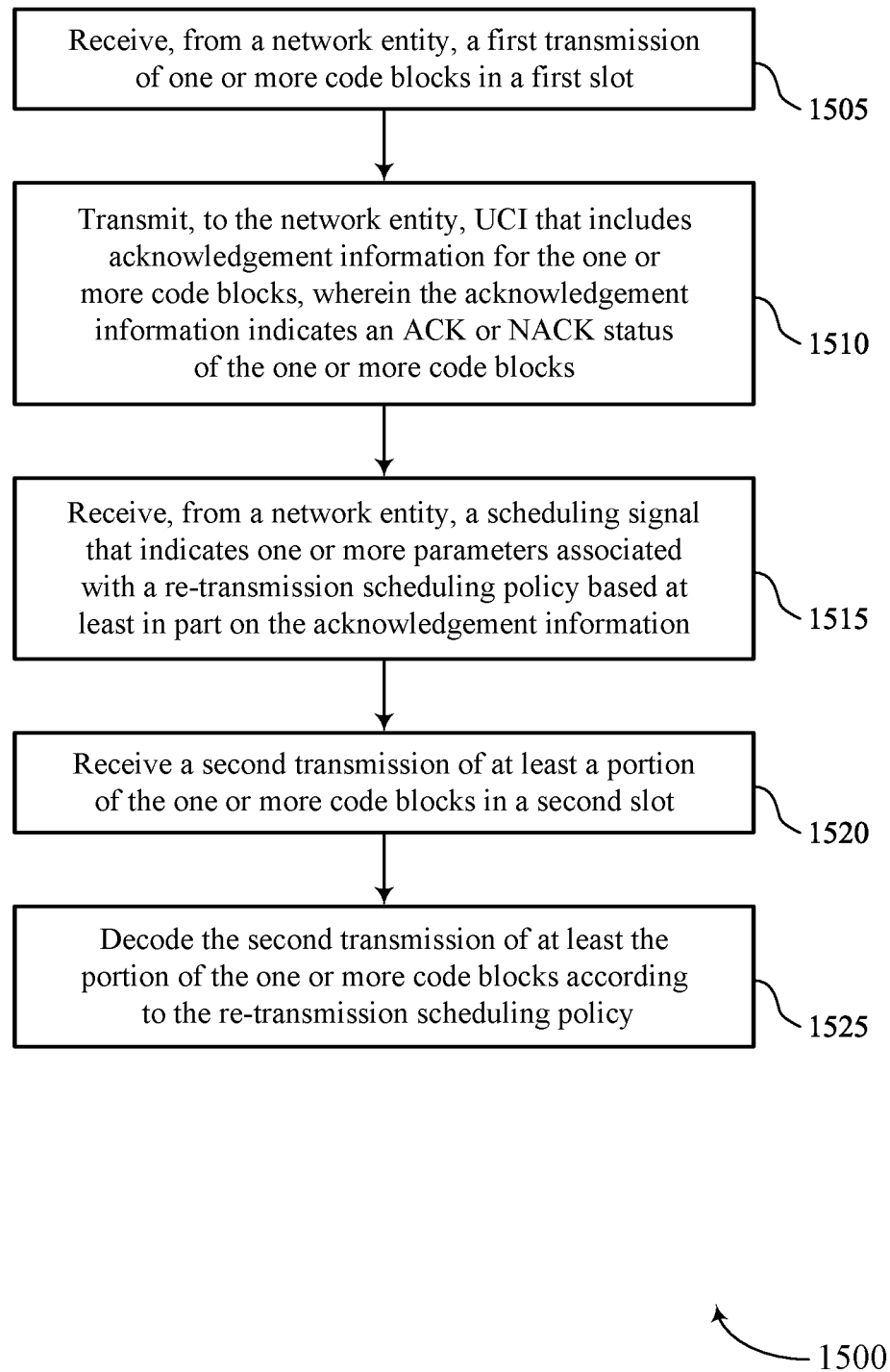
FIGS. 15 and 16 show flowcharts illustrating methods that support a DCI format for PDSCH scheduling for MIRS in accordance with one or more aspects of the present disclosure.

FIG. 15 shows a flowchart illustrating a method 1500 that supports a new DCI format for PDSCH scheduling for MIRS in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving, from a network entity, a first transmission of one or more code blocks in a first slot. The operations of 1505 may be performed in accordance with examples as disclosed herein. In some examples, aspects of the operations of 1505 may be performed by a code block manager 925 as described with reference to FIG. 9.

At 1510, the method may include transmitting, to the network entity, UCI that includes acknowledgement information for the one or more code blocks, where the acknowledgement information indicates an ACK/NACK status of the one or more code blocks. The operations of 1510 may be performed in accordance with examples as disclosed herein. In some examples, aspects of the operations of 1510 may be performed by a UCI manager 930 as described with reference to FIG. 9.

At 1515, the method may include receiving, from a network entity, a scheduling signal that indicates one or more parameters associated with a re-transmission scheduling policy based on the acknowledgement information. The operations of 1515 may be performed in accordance with examples as disclosed herein. In some examples, aspects of the operations of 1515 may be performed by a scheduling manager 935 as described with reference to FIG. 9.

At 1520, the method may include receiving a second transmission of at least a portion of the one or more code blocks in a second slot. The operations of 1520 may be performed in accordance with examples as disclosed herein. In some examples, aspects of the operations of 1520 may be performed by a code block manager 925 as described with reference to FIG. 9.

At 1525, the method may include decoding the second transmission of at least the portion of the one or more code blocks according to the re-transmission scheduling policy. The operations of 1525 may be performed in accordance with examples as disclosed herein. In some examples, aspects of the operations of 1525 may be performed by a decoder 940 as described with reference to FIG. 9.

Figure 16:
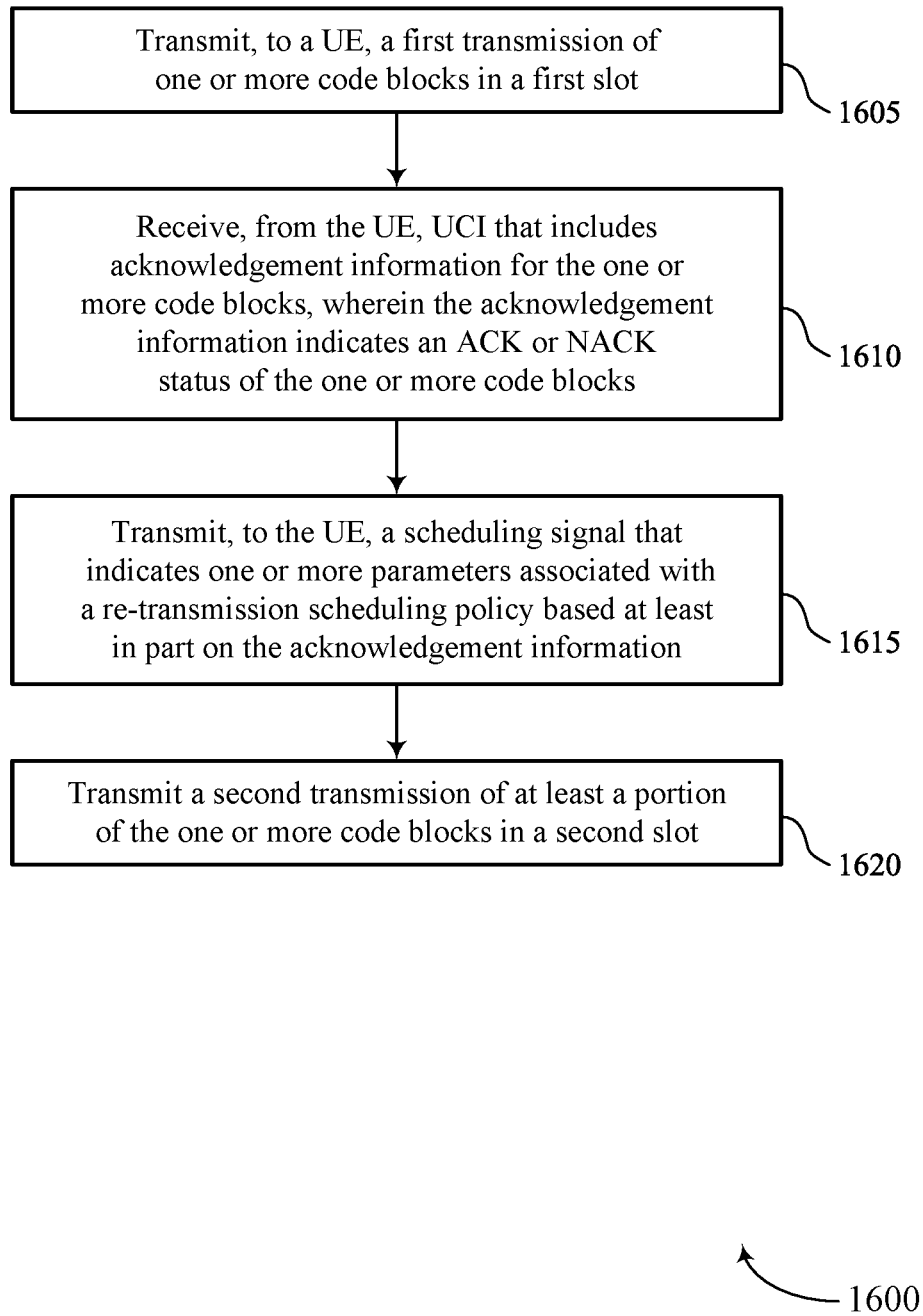

FIG. 16 shows a flowchart illustrating a method 1600 that supports a new DCI format for PDSCH scheduling for MIRS in accordance with one or more aspects of the present disclosure. The operations of the method 1600 may be implemented by a network entity or its components as described herein. For example, the operations of the method 1600 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, a first transmission of one or more code blocks in a first slot. The operations of 1605 may be performed in accordance with examples as disclosed herein. In some examples, aspects of the operations of 1605 may be performed by a transmission manager 1325 as described with reference to FIG. 13.

At 1610, the method may include receiving, from the UE, UCI that includes acknowledgement information for the one or more code blocks, where the acknowledgement information indicates an ACK/NACK status of the one or more code blocks. The operations of 1610 may be performed in accordance with examples as disclosed herein. In some examples, aspects of the operations of 1610 may be performed by a feedback manager 1330 as described with reference to FIG. 13.

At 1615, the method may include transmitting, to the UE, a scheduling signal that indicates one or more parameters associated with a re-transmission scheduling policy based on the acknowledgement information. The operations of 1615 may be performed in accordance with examples as disclosed herein. In some examples, aspects of the operations of 1615 may be performed by a network entity scheduling manager 1335 as described with reference to FIG. 13.

At 1620, the method may include transmitting a second transmission of at least a portion of the one or more code blocks in a second slot. The operations of 1620 may be performed in accordance with examples as disclosed herein. In some examples, aspects of the operations of 1620 may be performed by a transmission manager 1325 as described with reference to FIG. 13.

The following provides an overview of aspects of the present disclosure:

Aspect 1: A method for wireless communication, comprising: receiving, from a network entity, a first transmission of one or more code blocks in a first slot; transmitting, to the network entity, uplink control information that includes acknowledgement information for the one or more code blocks, wherein the acknowledgement information indicates an acknowledged or negative acknowledged status of the one or more code blocks; receiving, from a network entity, a scheduling signal that indicates one or more parameters associated with a re-transmission scheduling policy based at least in part on the acknowledgement information; receiving a second transmission of at least a portion of the one or more code blocks in a second slot; and decoding the second transmission of at least the portion of the one or more code blocks according to the re-transmission scheduling policy.

Aspect 2: The method of aspect 1, further comprising: receiving a confirmation signal that indicates received acknowledgement information on which the re-transmission scheduling policy is based.

Aspect 3: The method of aspect 2, further comprising: comparing the acknowledgement information for the one or more code blocks to the received acknowledgement information from the confirmation signal; and transmitting a correction signal that indicates that the received acknowledgement information is incorrect based at least in part on the received acknowledgement information not matching the acknowledged or negative acknowledged status of the one or more code blocks.

Aspect 4: The method of aspect 3, further comprising: receiving an updated scheduling signal that indicates one or more updated parameters based at least in part on the correction signal; and receiving a third transmission of at least the portion of the one or more code blocks, wherein decoding the third transmission is further based on the one or more updated parameters.

Aspect 5: The method of any of aspects 2 through 4, wherein the confirmation signal indicates an acknowledgement or negative acknowledgement status per code block or a decoding status of the uplink control information.

Aspect 6: The method of any of aspects 1 through 5, wherein the re-transmission scheduling policy further comprises an indication of a rank or a precoder resource group size, the rank or the precoder resource group size is associated with the first slot or the second slot.

Aspect 7: The method of any of aspects 1 through 6, wherein the one or more parameters associated with the re-transmission scheduling policy comprises a code block ordering in time and frequency, a redundancy version increase policy, a number of resources allocated per re-transmission, or a maximum number of re-transmissions for a code block.

Aspect 8: The method of any of aspects 1 through 7, further comprising: receiving a dedicated downlink control information message that indicates a list of code blocks excluded from the re-transmission scheduling policy.

Aspect 9: The method of any of aspects 1 through 8, further comprising: receiving downlink control information having a format of a first type; and overriding the re-transmission scheduling policy based at least in part on the downlink control information.

Aspect 10: The method of any of aspects 1 through 9, wherein the re-transmission scheduling policy indicates a latency priority for the one or more code blocks.

Aspect 11: The method of any of aspects 1 through 10, wherein receiving the scheduling signal further comprises: receiving the scheduling signal in a radio resource control message or a MAC control element.

Aspect 12: A method for wireless communication, comprising: transmitting, to a UE, a first transmission of one or more code blocks in a first slot; receiving, from the UE, uplink control information that includes acknowledgement information for the one or more code blocks, wherein the acknowledgement information indicates an acknowledged or negative acknowledged status of the one or more code blocks; transmitting, to the UE, a scheduling signal that indicates one or more parameters associated with a re-transmission scheduling policy based at least in part on the acknowledgement information; and transmitting a second transmission of at least a portion of the one or more code blocks in a second slot.

Aspect 13: The method of aspect 12, further comprising: transmitting, to the UE, a confirmation signal that indicates the received acknowledgement information on which the re-transmission scheduling policy is based.

Aspect 14: The method of aspect 13, further comprising: receiving, from the UE, a correction signal that indicates that the received acknowledgement information is incorrect based at least in part on the received acknowledgement information not matching an actual acknowledged or negative acknowledged status of the one or more code blocks.

Aspect 15: The method of aspect 14, further comprising: transmitting, to the UE, an updated scheduling signal that indicates one or more updated parameters based at least in part on the correction signal; and transmitting a third transmission of at least the portion of the one or more code blocks.

Aspect 16: The method of any of aspects 13 through 15, wherein the confirmation signal indicates an acknowledgement or negative acknowledgement status per code block or a decoding status of the uplink control information.

Aspect 17: The method of any of aspects 12 through 16, wherein the re-transmission scheduling policy further comprises an indication of a rank or a precoder resource group size, the rank or the precoder resource group size is associated with the first slot or the second slot.

Aspect 18: The method of any of aspects 12 through 17, wherein the one or more parameters associated with the re-transmission scheduling policy comprises a code block ordering in time and frequency, a redundancy version increase policy, a number of resources allocated per re-transmission, or a maximum number of re-transmissions for a code block.

Aspect 19: The method of any of aspects 12 through 18, further comprising: transmitting, to the UE, a dedicated downlink control information message that indicates a list of code blocks excluded from the re-transmission scheduling policy.

Aspect 20: The method of any of aspects 12 through 19, further comprising: transmitting, to the UE, downlink control information having a format of a first type, wherein the re-transmission scheduling policy does not apply to a subset of the one or more code blocks based at least in part on the downlink control information.

Aspect 21: The method of any of aspects 12 through 20, wherein the re-transmission scheduling policy indicates a latency priority for the one or more code blocks.

Aspect 22: The method of any of aspects 12 through 21, wherein transmitting the scheduling signal further comprises: transmitting, to the UE, the scheduling signal in a radio resource control message or a MAC control element.

Aspect 23: An apparatus for wireless communication, comprising a processor; memory coupled with the processor; and instructions stored in the memory and executable by the processor to cause the apparatus to perform a method of any of aspects 1 through 11.

Aspect 24: An apparatus for wireless communication, comprising at least one means for performing a method of any of aspects 1 through 11.

Aspect 25: A non-transitory computer-readable medium storing code for wireless communication, the code comprising instructions executable by a processor to perform a method of any of aspects 1 through 11.

Aspect 26: An apparatus for wireless communication, comprising a processor; memory coupled with the processor; and instructions stored in the memory and executable by the processor to cause the apparatus to perform a method of any of aspects 12 through 22.

Aspect 27: An apparatus for wireless communication, comprising at least one means for performing a method of any of aspects 12 through 22.

Aspect 28: A non-transitory computer-readable medium storing code for wireless communication, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive, from a network entity, a first transmission of one or more code blocks in a first slot;
      transmit, to the network entity, uplink control information that includes first acknowledgement information for the one or more code blocks, wherein the first acknowledgement information indicates an acknowledged status or a negative acknowledged status of the one or more code blocks;
      receive, from the network entity, a scheduling signal that indicates one or more parameters associated with a re-transmission scheduling policy based at least in part on the first acknowledgement information;
      receive, from the network entity, a confirmation signal that indicates second acknowledgement information for the first acknowledgement information, the second acknowledgement information indicating whether the network entity received the acknowledged status or the negative acknowledged status of the one or more code blocks via the first acknowledgement information;
      receive, from the network entity, a second transmission of at least a portion of the one or more code blocks in a second slot, the second transmission being in accordance with the one or more parameters associated with the re-transmission scheduling policy, wherein reception of the second transmission is based at least in part on the confirmation signal; and
      decode, at the UE, the second transmission of at least the portion of the one or more code blocks according to the re-transmission scheduling policy.

2. The apparatus of claim 1, wherein
   the confirmation signal corresponds to the first acknowledgement information that the re-transmission scheduling policy is based at least in part on.

3. The apparatus of claim 2, wherein the instructions are further executable by the processor to cause the apparatus to:
   compare the first acknowledgement information for the one or more code blocks to the second acknowledgement information from the confirmation signal; and
   transmit, to the network entity, a correction signal that indicates that the second acknowledgement information is incorrect based at least in part on the second acknowledgement information not matching the acknowledged status or the negative acknowledged status of the one or more code blocks indicated via the first acknowledgement information.

4. The apparatus of claim 3, wherein the instructions are further executable by the processor to cause the apparatus to:
receive, from the network entity, an updated scheduling signal that indicates one or more updated parameters based at least in part on the correction signal; and
receive, from the network entity, a third transmission of at least the portion of the one or more code blocks, wherein decoding the third transmission is further based on the one or more updated parameters.

5. The apparatus of claim 2, wherein the confirmation signal indicates the second acknowledgement information per code block or the second acknowledgement information indicates a decoding status of the uplink control information.

6. The apparatus of claim 1, wherein:
the re-transmission scheduling policy further comprises an indication of a rank or a precoder resource group size, and
the rank or the precoder resource group size is associated with the first slot or the second slot.

7. The apparatus of claim 1, wherein the one or more parameters associated with the re-transmission scheduling policy comprises a code block ordering in time and frequency, a redundancy version increase policy, a number of resources allocated per re-transmission, or a maximum number of re-transmissions for a code block.

8. The apparatus of claim 1, wherein the instructions are further executable by the processor to cause the apparatus to:
receive, from the network entity, a dedicated downlink control information message that indicates a list of code blocks excluded from the re-transmission scheduling policy.

9. The apparatus of claim 1, wherein the instructions are further executable by the processor to cause the apparatus to:
receive, from the network entity, downlink control information having a format of a first type; and
override the re-transmission scheduling policy based at least in part on the downlink control information.

10. The apparatus of claim 1, wherein the re-transmission scheduling policy indicates a latency priority for the one or more code blocks.

11. The apparatus of claim 1, wherein the instructions to receive the scheduling signal are further executable by the processor to cause the apparatus to:
receive, from the network entity, the scheduling signal in a radio resource control message or a media access control (MAC) control element.

12. An apparatus for wireless communication at a network entity, comprising:
a processor;
memory coupled with the processor; and
instructions stored in the memory and executable by the processor to cause the apparatus to:
transmit, to a user equipment (UE), a first transmission of one or more code blocks in a first slot;
receive, from the UE, uplink control information that includes first acknowledgement information for the one or more code blocks, wherein the first acknowledgement information indicates an acknowledged status or a negative acknowledged status of the one or more code blocks;
transmit, to the UE, a scheduling signal that indicates one or more parameters associated with a re-transmission scheduling policy based at least in part on the first acknowledgement information;
transmit, to the UE, a confirmation signal that indicates second acknowledgement information for the first acknowledgement information, the second acknowledgement information indicating whether the network entity received the acknowledged status or the negative acknowledged status of the one or more code blocks via the first acknowledgement information; and
transmit, to the UE, a second transmission of at least a portion of the one or more code blocks in a second slot, the second transmission being in accordance with the one or more parameters associated with the re-transmission scheduling policy, wherein transmission of the second transmission is based at least in part on the confirmation signal.

13. The apparatus of claim 12, wherein
the confirmation signal corresponds to the first acknowledgement information that the re-transmission scheduling policy is based at least in part on.

14. The apparatus of claim 13, wherein the instructions are further executable by the processor to cause the apparatus to:
receive, from the UE, a correction signal that indicates that the second acknowledgement information is incorrect based at least in part on the second acknowledgement information not matching an actual acknowledged status or an actual negative acknowledged status of the one or more code blocks.

15. The apparatus of claim 14, wherein the instructions are further executable by the processor to cause the apparatus to:
transmit, to the UE, an updated scheduling signal that indicates one or more updated parameters based at least in part on the correction signal; and
transmit, to the UE, a third transmission of at least the portion of the one or more code blocks.

16. The apparatus of claim 13, wherein the confirmation signal indicates the second acknowledgement information per code block or the second acknowledgement information indicates a decoding status of the uplink control information.

17. The apparatus of claim 12, wherein:
the re-transmission scheduling policy further comprises an indication of a rank or a precoder resource group size, and
the rank or the precoder resource group size is associated with the first slot or the second slot.

18. The apparatus of claim 12, wherein the one or more parameters associated with the re-transmission scheduling policy comprises a code block ordering in time and frequency, a redundancy version increase policy, a number of resources allocated per re-transmission, or a maximum number of re-transmissions for a code block.

19. The apparatus of claim 12, wherein the instructions are further executable by the processor to cause the apparatus to:
transmit, to the UE, a dedicated downlink control information message that indicates a list of code blocks excluded from the re-transmission scheduling policy.

20. The apparatus of claim 12, wherein the instructions are further executable by the processor to cause the apparatus to:
transmit, to the UE, downlink control information having a format of a first type, wherein the re-transmission scheduling policy does not apply to a subset of the one or more code blocks based at least in part on the downlink control information.

21. The apparatus of claim 12, wherein the re-transmission scheduling policy indicates a latency priority for the one or more code blocks.

22. The apparatus of claim 12, wherein the instructions to transmit the scheduling signal are further executable by the processor to cause the apparatus to:

transmit, to the UE, the scheduling signal in a radio resource control message or a media access control (MAC) control element.

23. A method for wireless communication at a user equipment (UE), comprising:

receiving, from a network entity, a first transmission of one or more code blocks in a first slot;

transmitting, to the network entity, uplink control information that includes first acknowledgement information for the one or more code blocks, wherein the first acknowledgement information indicates an acknowledged status or a negative acknowledged status of the one or more code blocks;

receiving, from the network entity, a scheduling signal that indicates one or more parameters associated with a re-transmission scheduling policy based at least in part on the first acknowledgement information;

receiving, from the network entity, a confirmation signal that indicates second acknowledgement information for the first acknowledgement information, the second acknowledgement information indicating whether the network entity received the acknowledged status or the negative acknowledged status of the one or more code blocks via the first acknowledgement information;

receiving, from the network entity, a second transmission of at least a portion of the one or more code blocks in a second slot, the second transmission being in accordance with the one or more parameters associated with the re-transmission scheduling policy, wherein reception of the second transmission is based at least in part on the confirmation signal; and decoding, at the UE, the second transmission of at least the portion of the one or more code blocks according to the re-transmission scheduling policy.

24. The method of claim 23, wherein the confirmation signal corresponds to the first acknowledgement information that the re-transmission scheduling policy is based at least in part on, and the method further comprises:

comparing the first acknowledgement information for the one or more code blocks to the second acknowledgement information from the confirmation signal; and transmitting, to the network entity, a correction signal that indicates that the second acknowledgement information is incorrect based at least in part on the second acknowledgement information not matching the acknowledged status or the negative acknowledged status of the one or more code blocks indicated via the first acknowledgement information.

25. The method of claim 23, wherein:

the re-transmission scheduling policy further comprises an indication of a rank or a precoder resource group size, and the rank or the precoder resource group size is associated with the first slot or the second slot.

26. The method of claim 23, further comprising:

receiving, from the network entity, a dedicated downlink control information message that indicates a list of code blocks excluded from the re-transmission scheduling policy.

27. The method of claim 23, further comprising:

receiving, from the network entity, downlink control information having a format of a first type; and overriding the re-transmission scheduling policy based at least in part on the downlink control information.

28. A method for wireless communication at a network entity, comprising:

transmitting, to a user equipment (UE), a first transmission of one or more code blocks in a first slot;

receiving, from the UE, uplink control information that includes first acknowledgement information for the one or more code blocks, wherein the first acknowledgement information indicates an acknowledged status or a negative acknowledged status of the one or more code blocks;

transmitting, to the UE, a scheduling signal that indicates one or more parameters associated with a re-transmission scheduling policy based at least in part on the first acknowledgement information;

transmitting, to the UE, a confirmation signal that indicates second acknowledgement information for the first acknowledgement information, the second acknowledgement information indicating whether the network entity received the acknowledged status or the negative acknowledged status of the one or more code blocks via the first acknowledgement information; and transmitting, from the UE, a second transmission of at least a portion of the one or more code blocks in a second slot, the second transmission being in accordance with the one or more parameters associated with the re-transmission scheduling policy, wherein transmission of the second transmission is based at least in part on the confirmation signal.

29. The method of claim 28, wherein the confirmation signal corresponds to the first acknowledgement information that the re-transmission scheduling policy is based at least in part on, and the method further comprises:

receiving, from the UE, a correction signal that indicates that the second acknowledgement information is incorrect based at least in part on the second acknowledgement information not matching an actual acknowledged status or an actual negative acknowledged status of the one or more code blocks.

30. The method of claim 28, further comprising:

transmitting, to the UE, a dedicated downlink control information message that indicates a list of code blocks excluded from the re-transmission scheduling policy.

* * * * *